United States Patent
Harumoto et al.

(10) Patent No.: US 7,123,819 B2
(45) Date of Patent: Oct. 17, 2006

(54) ENCODING/RECORDING DEVICE THAT SUSPENDS ENCODING FOR VIDEO DATA AND SAMPLING FOR AN AUDIO SIGNAL IN RESPONSE TO A RECORDING PAUSE INSTRUCTION SO AS TO ALLOW DATA RECORDED BEFORE AND AFTER RECORDING PAUSE TO BE CONTINUOUSLY REPRODUCED

(75) Inventors: Hideaki Harumoto, Moriguchi (JP); Tomoyuki Okada, Edinburgh (GB); Shiro Iwasaki, Iizuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 329 days.

(21) Appl. No.: 10/893,321

(22) Filed: Jul. 19, 2004

(65) Prior Publication Data

US 2004/0264925 A1 Dec. 30, 2004

Related U.S. Application Data

(63) Continuation of application No. 09/666,484, filed on Sep. 20, 2000, now Pat. No. 6,801,707.

(30) Foreign Application Priority Data

Sep. 20, 1999 (JP) ................... 11-265575

(51) Int. Cl.
H04N 7/04 (2006.01)
H04N 5/91 (2006.01)
(52) U.S. Cl. ......................... 386/98; 386/104
(58) Field of Classification Search ............... 386/46, 386/98, 104, 105, 109, 111, 112, 27, 37, 39, 386/52
See application file for complete search history.

(56) References Cited

U.S. PATENT DOCUMENTS

| 5,323,367 | A |   | 6/1994 | Tamura et al. |
|---|---|---|---|---|
| 5,526,125 | A | * | 6/1996 | Mori et al. ............ 386/52 |
| 5,537,148 | A |   | 7/1996 | Fujinami |
| 5,617,502 | A |   | 4/1997 | Ort et al. |

(Continued)

FOREIGN PATENT DOCUMENTS

EP  0 618 695  10/1994

(Continued)

*Primary Examiner*—Robert Chevalier
(74) *Attorney, Agent, or Firm*—Wenderoth, Lind & Ponack, L.L.P.

(57) ABSTRACT

An encoding/recording device encodes a video signal according to MPEG, encodes an audio signal with a predetermined method, and multiplexes the encoded video signal and the audio signal to produce a system stream. The encoding/recording device then records the system stream onto a recording medium. On receiving a pause instruction, the encoding/recording device suspends reception of the audio signal and the video signal in synchronization with a timing with which the video signal is received, and thereafter suspends encoding, multiplexing, and recording for the audio signal and the video signal with predetermined timings. On receiving a pause release instruction, the encoding/recording device resumes reception of the audio signal and the video signal in synchronization with a timing with which the video signal is received, and thereafter resumes the encoding, the multiplexing, and the recording with predetermined timings. When suspending the encoding for the video signal, the encoding/recording device keeps information showing how an amount of video data accumulated in a buffer in a virtual decoder changes, and uses the kept information when resuming the encoding.

14 Claims, 16 Drawing Sheets

U.S. PATENT DOCUMENTS

| | | |
|---|---|---|
| 5,784,522 A | 7/1998 | Yamamura |
| 5,808,722 A | 9/1998 | Suzuki |
| 5,953,481 A * | 9/1999 | Watanabe et al. ............. 386/52 |
| 2004/0008788 A1 | 1/2004 | Kono et al. |

FOREIGN PATENT DOCUMENTS

| | | |
|---|---|---|
| EP | 0 644 692 | 3/1995 |
| EP | 0 795 874 | 9/1997 |

* cited by examiner

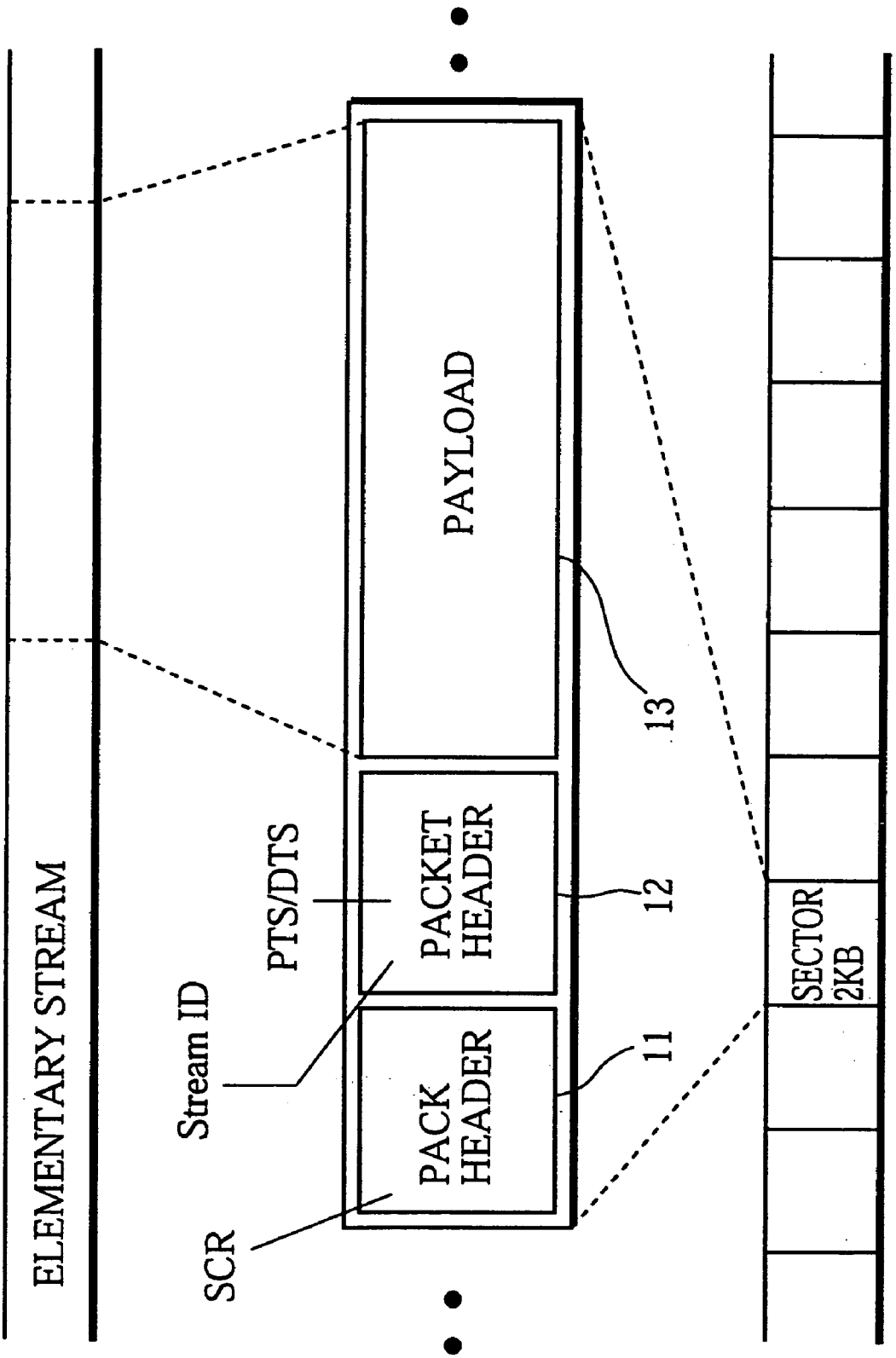

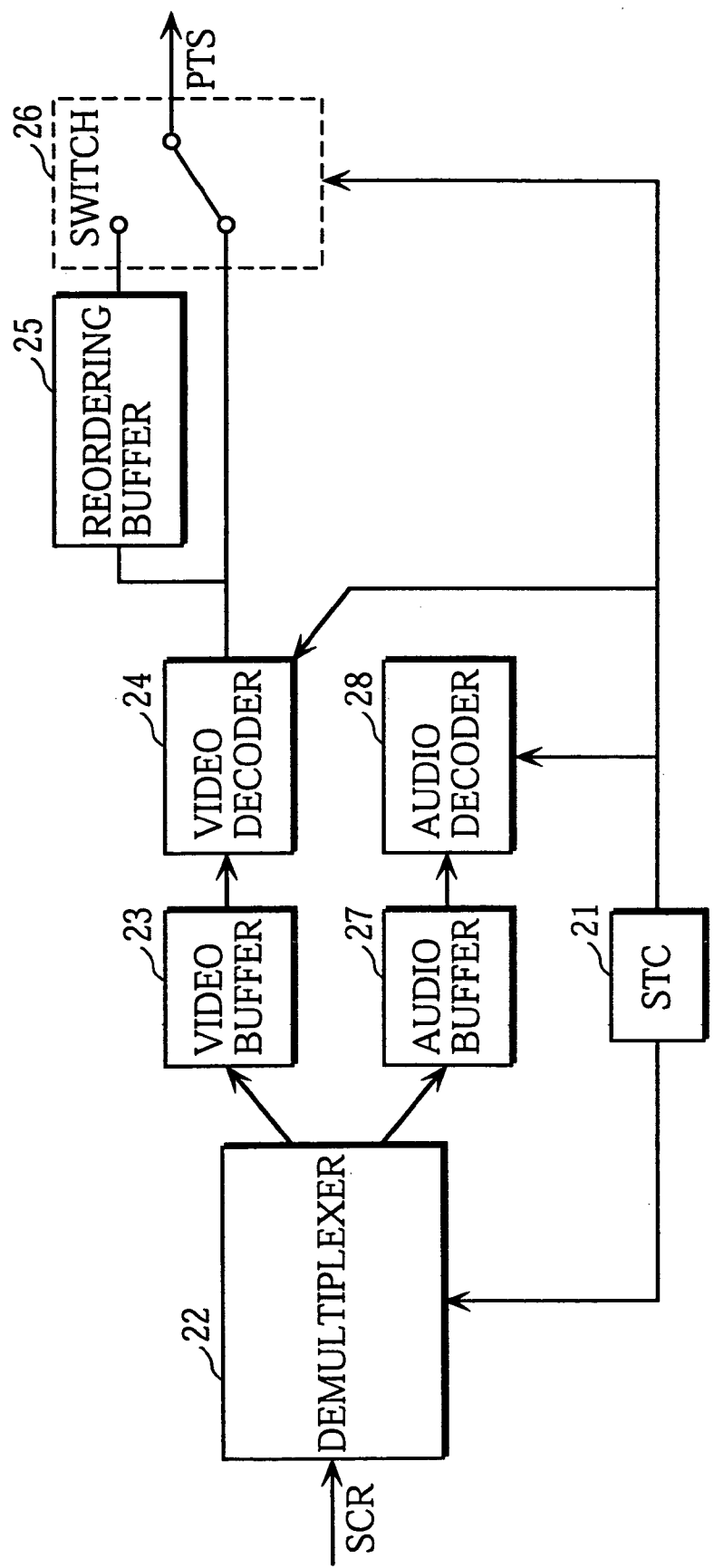

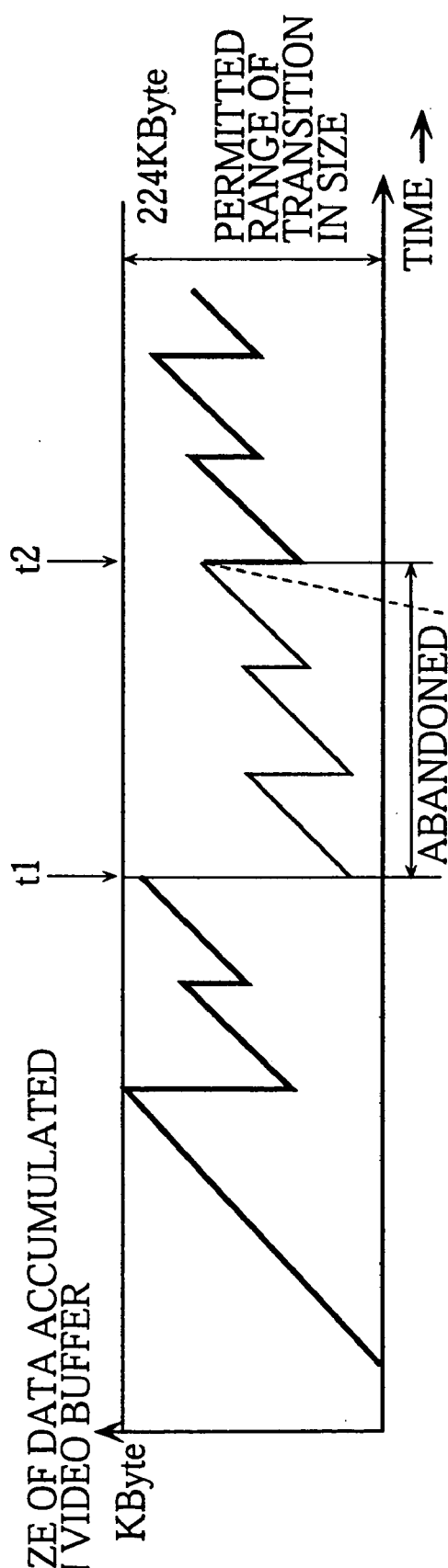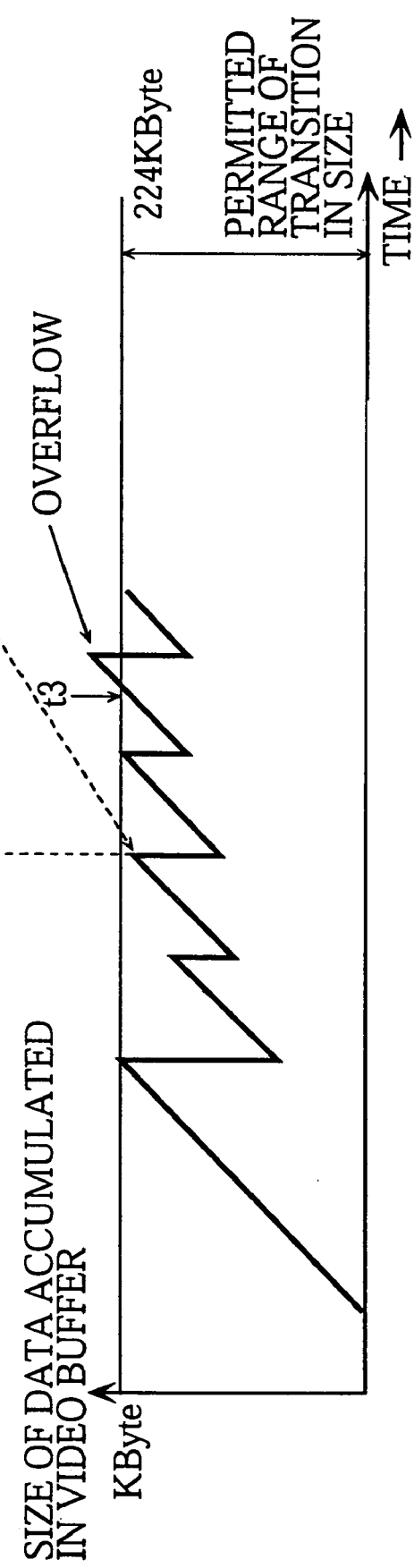

FIG. 13 PROCESSING TO STOP RECORDING AFTER PAUSE

ENCODING/RECORDING DEVICE THAT SUSPENDS ENCODING FOR VIDEO DATA AND SAMPLING FOR AN AUDIO SIGNAL IN RESPONSE TO A RECORDING PAUSE INSTRUCTION SO AS TO ALLOW DATA RECORDED BEFORE AND AFTER RECORDING PAUSE TO BE CONTINUOUSLY REPRODUCED

This application is a continuation of application Ser. No. 09/666,484, filed Sep. 20, 2000 now U.S. Pat. No. 6,801,707.

This application is based on application No. 11-265575 filed in Japan, the content of which is hereby incorporated by reference.

BACKGROUND OF THE INVENTION (1) Field of the Invention

The present invention relates to an encoding/recording device and an encoding/recording method for compressing and encoding video data based on time correlation properties of the video data, multiplexing the video data with audio data, and recording the multiplexed video data and audio data. More specifically, the present invention relates to a technology for enhancing a function to suspend recording by the encoding/recording device.

(2) Description of the Prior Art

In recent years, increasing amount of information is digitized. Especially, more and more sound and images are digitized since digital information suffers no degradation with the passage of time and is relatively easy to be processed. Hereafter, sound and images in digital format is collectively called "AV (audio-video) data".

MPEG (Moving Picture Expert Group, including MPEG-2 in this specification) is an international standard used to compress AV data to record it effectively.

MPEG for video data uses a compression method based on time correlation properties between different pictures in addition to a conventionally used compression method based on discrete cosine transform (DCT). The compression method based on the time correlation properties achieves a high compression rate by representing one picture as differential data between the picture and other similar pictures to this picture which are reproduced before and after this picture. However, with this MPEG based on the time correlation properties, presenting order and decoding order for pictures are different, and therefore it is necessary to record, or decode and store a picture that is referred to for encoding another picture, prior to the other picture that refers to this picture. For MPEG, a picture that is referred to for encoding of another picture is called an I picture (intraframe predictively encoded picture) or a P picture (interframe predictively encoded picture). A picture that is encoded referring to another picture (I or P picture) is called a B picture (bi-directionally predictively encoded picture).

Video data is a plurality of sets of still image data per unit time (each set of still image data is hereafter called a video frame), and therefore video data usually contains similar images. As MPEG can provide a higher compression rate for video data containing more images similar to one another, MPEG is suitable for compression of video data.

MPEG can effectively compress data by providing a different compression rate for each image and dynamically assigning encoding bits to the image in accordance with its complexity.

Audio data, on the other hand, has a smaller size than video data, and therefore a different compression method than used for the video data is usually used.

For instance, a DVD recorder that records AV data onto a DVD-RAM according to MPEG allows a user to select whether to compress audio data. When selecting that the AV data should be compressed, the user can further select whether MPEG Audio or Dolby AC3 should be used as a compression method. The DVD recorder then encodes the audio data using the selected compression method. When the user selects that no compression is performed for the audio data, LPCM (linear pulse code modulation) is performed for the audio data. The DVD recorder then encodes and compresses video data according to MPEG, multiplexes the encoded video data and audio data into a piece of MPEG System stream according to MPEG System, and records the piece of MPEG System stream.

With MPEG System, audio data and video data, which have been encoded and compressed, are divided into audio packets and video packets that have predetermined sizes, and time-division multiplexed into MPEG System stream. Hereafter, the terms "audio data" and "video data" are used to represent audio data and video data that have been encoded and compressed. MPEG System stream has a hierarchical structure composed of a pack and a packet, with one pack being composed of one or more packets. For instance, a pack recorded on a DVD-RAM is composed of one packet. For ease of explanation, one pack is assumed to be composed of one packet in this specification, as is the case with a pack recorded on a DVD-RAM.

FIG. 1 shows a construction of a pack and a packet generated according to MPEG System.

Each packet is 2 KB, and contains a pack header 11, a packet header 12, and a payload 13.

The pack header 11 contains an SCR (system clock reference) that shows a time at which the pack should be inputted to a video buffer or an audio buffer in an MPEG decoder.

The packet header 12 contains the following information: a stream ID that identifies the content of the payload 13; a DTS (Decoding Time Stamp) showing a decoding start time; and a PTS (Presentation Time Stamp) showing a presentation time. Note that an audio pack does not contain a DTS since audio data is decoded and presented almost simultaneously.

The payload 13 is audio data or video data.

Audio data is usually divided into audio packets that each contain audio data corresponding to one audio frame, and therefore a large-capacity audio buffer is not required by the MPEG decoder. As with video data, however, video frames have different sizes, and the differences in the size between different video frames are very large. For instance, video data corresponding to one video frame may be divided into a plurality of video packets. Accordingly, an MPEG decoder is required to have a video buffer that has at least the same size as a video frame of the largest size. Packs are positioned in MPEG System stream in order of an SCR, the earliest SCR first.

FIG. 2 is a diagram showing a standard decoder for MPEG System stream.

This MPEG decoder comprises the following elements: an STC (system time clock) 21 that generates a system time based on which the MPEG decoder operates, a demultiplexer 22 that separates system stream into audio packets and video packets based on a stream ID of each packet; a video buffer 23 that temporarily buffers video data; a video decoder 24 that decodes video data; a reordering buffer 25 that temporarily stores video data to be referred to by other video data; a switch 26 that is used to adjust output order of video data; an audio buffer 27 that temporarily buffers audio data; and an audio decoder 28 that decodes audio data.

The following describes decoding operations by this MPEG decoder.

A pack is extracted to be inputted to the demultiplexer 22 when a system time generated by the STC 21 agrees with an SCR written in the pack. The demultiplexer 22 then refers to a stream ID of the inputted pack and sends a packet in the pack to either the video buffer 22 or the audio buffer 27 accordingly. The video buffer 23 accumulates payloads of packets sent by the demultiplexer 22 and manages a DTS and a PTS of each packet. The video decoder 24 reads video data that has a DTS equal to a current system time from the video buffer 23. This read video data corresponds to one video frame. The video decoder 24 then decodes the read video data. Following this, video data (i.e., an I picture or a P picture) which is referred to for encoding of other pictures is temporality buffered by the reordering buffer 25, and selectively outputted in accordance with a PTS via the switch 26. The video decoder 24 decodes video data (i.e., B picture) that is encoded referring to other pictures, and outputs it immediately. On receiving audio data that is a payload of each audio packet from the demultiplexer 22, the audio buffer 27 buffers it and manages a PTS in the audio packet. The audio decoder 28 reads audio data that has a PTS equal to a current system time from the audio buffer 37. This read audio data corresponds to one audio frame. The audio decoder 28 then decodes the read audio data.

In order to present images without delays, MPEG defines that an MPEG decoder starts decoding video data only after the video buffer 23 has become full. This generates a time lag between a start of accumulation of packets in the video buffer and a start of decoding for video data. This time lag is called "vbv_delay" in MPEG. MPEG also defines a capacity of a video buffer as 224 KB, and data of a size exceeding this capacity is not allowed to be buffered. MPEG further defines that the video buffer cannot buffer the same data for one second or longer.

To control a video buffer in accordance with MPEG in this way, an MPEG encoder assigns an SCR and a DTS to each pack appropriately when such packs are recorded.

In this way, video data has to be inputted to a video buffer a certain time before the video data is presented, while audio data has to be inputted to an audio buffer only shortly before its presentation. Accordingly, when video data and audio data should be presented simultaneously, the video data is multiplexed in prior to the audio data.

When a sequence of images is recorded after one recording for another sequence has been completed, the aforementioned time lag "vbv_delay" is generated between the two sequences, which prevents the two sequences from being continuously reproduced. This can happen, for instance, when a program and commercials are broadcasted and only the program is recorded without the commercials being recorded, or when different sequences, which are not consecutive, of images are taken by a digital video camera.

When packets corresponding to different sequences, which are not consecutive, are joined together to prevent the vbv_delay from being generated, however, a video buffer in the MPEG decoder can no longer be used in accordance with MPEG standard, and therefore may suffer a breakdown.

FIG. 3A shows transition of a size of video data buffered in a video buffer in an MPEG decoder used when video data for a sequence of consecutive images is reproduced. FIG. 3B shows transition of a size of video data buffered in the video buffer when video packets, which are not consecutive and have been joined together, are reproduced.

In FIG. 3B, the video buffer overflows at time t3 as a result of non-consecutive packets composed of packets corresponding to a period before time t1 in FIG. 3A and packets corresponding to a period after time t2 being joined together by discarding packets corresponding to a period from t1 to t2.

Joining non-consecutive packets without special considerations being given also causes the following problems.

To simultaneously present sound and images, an audio pack is multiplexed into MPEG System stream after a period equal to "vbv_delay" has passed since a video pack was multiplexed into the MPEG System stream. As a result, if video packets and audio packets corresponding to a certain period in MPEG System stream are discarded, and packets before and after the certain period are joined together, sound corresponding to images immediately before the joined part of the stream are lost while sounds corresponding to the discarded images remain.

Secondly, since an audio frame and a video frame have different frame generation frequencies, deleting certain audio frames and video frames in units of respective frames results in generating a time lag, the so-called "lip sync (synchronization) lag", between sound and images for frames that follow the deleted frames. For instance, Dolby Digital AC-3 compresses audio data for a DVD-RAM as audio frames whose frame generation frequency is 32 msec although a video frame has a frame generation frequency of 33.3667 msec. Accordingly, the lip sync lag will almost certainly occur if certain audio frames and video frames are deleted in units of respective frames.

Lastly, when two non-consecutive audio frames are joined together after certain audio frames are deleted, the two non-consecutive audio frames often do not have similarities. As a result, noise is generated when these audio frames are inputted to an audio buffer to be reproduced.

Accordingly, it is not appropriate to delete certain packets or frames from MPEG System stream and to join remaining packets or frames together without special considerations being given.

SUMMARY OF THE INVENTION

The present invention is made in view of the above problems, and aims to provide an encoding/recording device and an encoding/recording method for consecutively recording different pieces of AV stream, which are not consecutive in terms of time, without causing malfunctions to occur in the above video buffer in the MPEG decoder, and to provide a recording medium storing a program to have a computer perform the encoding/recording method.

The present invention also aims to provide an encoding/recording device, an encoding/recording method, and a recording medium storing a program to have a computer perform the encoding/recording method for recording non-consecutive AV data in a manner that allows the recorded non-consecutive AV data to be reproduced without troubles relating to sound, such as unnecessary noise and a time lag between images and sound like "lip sync" lag, being involved.

In order to achieve the above objects, the present invention relates to an encoding/recording device that receives and encodes a video signal and an audio signal, multiplexes the encoded video signal and audio signal to produce a system stream, and records the system stream on a recording medium. The encoding/recording device includes: a video data generating unit operable to (a) estimate an amount of data, which occupies a buffer in a decoder when the decoder decodes the encoded video signal (b) store how the amount of data changes over time as buffer information, (c) receive a video signal, (d) encode the received video signal to generate video data in a manner that prevents the decoder from overflowing and underflowing, and (e) update the buffer information whenever video data is generated, an audio data generating unit operable to receive an audio signal, and encode each part of the received audio signal to generate audio data, each part having a predetermined size; a multiplexing/recording unit operable to multiplex the generated video data and audio data, and record the multiplexed video data and audio data onto the recording medium; a pause controlling unit operable to specify a pause timing on receiving a pause instruction that suspends recording by the encoding/recording device from a user during the recording, and have the video data generating unit, the audio data generating unit, and the multiplexing/recording unit suspend operations; and a pause release controlling unit operable to specify a pause release timing on receiving a pause release instruction from the user, and have the video data generating unit, the audio data generating unit, and the multiplexing/recording unit resume the operations. Under control of the pause controlling unit, the video data generating unit suspends reception of the video signal with the specified pause timing without resetting the stored buffer information. Under control of the pause release controlling unit, the video data generating unit resumes the reception the video signal with the specified pause release timing and resumes encoding the received video signal based on the stored buffer information. Under control of the pause controlling unit, the audio data generating unit suspends reception of the audio signal with the specified pause timing. Under control of the pause release controlling unit, the audio data generating unit resumes receiving the audio signal with the specified pause release timing, and resumes encoding the received audio signal. The multiplexing/recording unit suspends multiplexing and recording with a predetermined timing that is equal to or later than the specified pause timing under control of the pause controlling unit, and resumes the multiplexing and the recording with a predetermined timing that is equal to or later than the specified pause release timing under control of the pause release controlling unit.

When the user records non-consecutive pieces of AV stream, using the above suspension function, the recorded pieces of AV stream can be consecutively and "seamlessly" reproduced with no intervals being generated between the pieces of AV stream. In addition, the video buffer in the MPEG decoder will not be broken even when AV data, which has been recorded after the recording pause, is reproduced.

Here, the video data generating unit may encode the received video signal according to MPEG (Moving Picture Expert Group).

For this construction, the video data generating unit can estimate an amount of data that occupies a buffer in an MPEG decoder and encode the received video signal according to MPEG in a manner that prevents the buffer from underflowing and overflowing.

Here, the encoding/recording device may further include a timer that generates a reference time at least when the encoding/recording device operates and suspends recording. Every first predetermine period, the video data generating unit receives a video signal that corresponds to one video frame, each first predetermined period being based on a reference time generated by the timer. The pause timing specified by the pause controlling unit is synchronous to a boundary of two first predetermined periods, and the pause release timing specified by the pause release controlling unit is synchronous to a boundary of two first predetermined periods.

For this construction, input of the video signal and the audio signal is suspended in synchronization with a timing with which a boundary of two video frames appears. As a result, recording can be suspended for each video frame, and no time lags are generated between reproduced images and sound which were recorded after the suspension was released.

Here, under control of the pause controlling unit, the multiplexing/recording unit may suspend the multiplexing and the recording after a second predetermined period has passed since the specified pause timing, and may hold video data and audio data which have not been multiplexed and recorded. Under control of the pause release controlling unit, the multiplexing/recording unit may resume the multiplexing and the recording by multiplexing and recording the held video data and audio data after the second predetermined period has passed since the specified pause release timing.

For this construction, the multiplexing/recording unit suspends the multiplexing and the recording after the second predetermined period has passed since the specified pause timing, and holds video data and audio data that have not been multiplexed and recorded at this point. As a result, the present encoding/recording device can correctly record AV data even after the suspension is released.

Here, after a third predetermined period has passed since the specified pause timing, the video data generating unit may complete encoding for the video signal which has been received before the specified pause timing. The second predetermined period for the multiplexing/recording unit may be a sum of the first predetermined period and the third predetermined period.

For this construction, the multiplexing/recording unit suspends the recording and the multiplexing after a time, which has the same duration as a frame generation cycle for video data, has passed since generation of video data was completed, and resumes the recording and the multiplexing after a time having the same duration as the frame generation cycle has passed since when generation of video data was resumed. As a result, it becomes possible to make a period for which the multiplexing/recording unit suspends the multiplexing and the recording approximately equal to a period for which reception of the audio signal and the video signal is suspended.

Here, the encoding/recording device may further include a first stop controlling unit operable to specify a stop timing on receiving a stop instruction from the user while the encoding/recording device operates, and have the video data generating unit, the audio data generating unit, and the multiplexing/recording unit stop operations. Under control of the first stop controlling unit, the video data generating unit may stop receiving the video signal with the specified stop timing, and encode the video signal received before the stop timing to generate video data. Under control of the first stop controlling unit, the audio data generating unit may stop receiving the audio signal with the specified stop timing, encode each part of the predetermined size contained in the received audio signal to generate audio data, and abandon, if the received audio signal contains a subpart that is smaller than the predetermined size, the subpart. Under control of the first stop controlling unit, the multiplexing/recording unit may multiplex and record all the audio data and video data that have been generated.

This construction allows the present encoding/recording device to completely stop its operations.

Here, the encoding/recording device may further include: a second stop controlling unit operable to specify a stop timing on receiving a stop instruction from the user while the encoding/recording device suspends recording in response to a recording pause instruction, and to have the video data generating unit, the audio data generating unit, and the multiplexing/recording unit stop operations. Under control of the second stop controlling unit, the video data generating unit may encode the video signal received before the specified pause timing to generate video data. Under control of the-second stop controlling unit, the audio data generating unit may encode each part of the audio signal received before the specified pause timing to generate audio data, and abandons, if the received audio signal contains a subpart, the subpart. Under control of the second stop controlling unit, the multiplexing/recording unit may multiplex and record the held video data and audio data, and the generated audio data and video data.

This construction allows the present encoding/recording device to properly stop after the suspension.

Here, the audio data generating unit may contain: an audio signal sampling unit operable to receive the audio. signal, sample the received audio signal to generate sets of sampled data that each correspond to one audio sampling cycle, each set of sampled data being generated every fourth predetermined period that is different from the first predetermined period, and suspend reception of the audio signal with the specified pause timing; an encoding unit operable to receive a set of sampled data from the audio signal sampling unit every fourth predetermined period, and encode the received set of sampled data to generate audio data corresponding to one audio sampling cycle; a fractional data holding unit operable to hold a set of sampled data which corresponds to a,time shorter than the fourth predetermined period when the audio signal sampling unit suspends the reception of the audio signal. The audio signal sampling unit may resume receiving the audio signal with the specified pause release timing, sample the received audio signal to generate a set of sampled data, join the generated set of sampled data and the held set of sampled data together to produce a set of sampled data corresponding to one audio sampling cycle, output the produced set of sampled data, and thereafter output a set of sampled data corresponding to one audio sampling cycle every fourth predetermined period.

For this construction, audio data smaller than a predetermined size can be held, so that no time lags occur between images and sound recorded after the suspension is released.

Here, under control of the pause controlling unit, the multiplexing/recording unit may suspend the multiplexing and the recording after having multiplexed and recorded all the video data generated by the video data generating unit.

With this construction, the present encoding/recording device suspends recording only after having recorded all the generated video data. Accordingly, video data can be correctly multiplexed and recorded after the suspension is released.

Here, when suspending the multiplexing and the recording, the multiplexing/recording unit may hold audio data that has not been multiplexed and recorded. Under control of the pause release controlling unit, the multiplexing/recording unit may resume the multiplexing and the recording by starting multiplexing and recording (a) the held audio data and (b) video data generated after the specified pause release timing.

For this construction, audio data, to which a later multiplexing order is applied, is held when the recording and the multiplexing are suspended. When the suspension is released, the held audio data are multiplexed after video data, which is generated after the suspension is released, are multiplexed. As a result, when images and sound recorded after the suspension are reproduced, a time lag will not be generated between the images and sound.

Here, the encoding/recording device may further include a first stop controlling unit operable to specify a stop timing on receiving a stop instruction from the user while the encoding/recording device operates, and to have the video data generating unit, the audio data generating unit, and the multiplexing/recording unit stop operations. Under control of the first stop controlling unit, the video data generating unit may stop receiving the video signal with the specified stop timing, and encode the video signal received before the stop timing to generate video data. Under control of the first stop controlling unit, the audio data generating unit may stop receiving the audio signal with the specified stop timing, encode each part of the predetermined size contained in the received audio signal to generate audio data, and abandon, if the received audio signal contains a subpart that is smaller than the predetermined size, the subpart. Under control of the first stop controlling unit, the multiplexing/recording unit may multiplex and record all the audio data and video data that have been generated.

For this construction, the encoding/recording device can stop after a recording operation.

Here, the multiplexing/recording unit may further contain a second stop controlling unit operable to specify a stop timing on receiving a stop instruction from the user while the encoding/recording device suspends recording, and have the video data generating unit, the audio data generating unit, and the multiplexing/recording unit stop operations. The audio data generating unit may abandon a subpart if the received audio signal contains the subpart. Under control of the second stop controlling unit, the multiplexing/recording unit may multiplex and record all the held audio data.

For this construction, the encoding/recording device can correctly stop after the recording pause.

Here, the audio data generating unit may contain: an audio signal sampling unit operable to receive the audio signal, sample the received audio signal to generate sets of sampled data that each correspond to one audio sampling cycle, each set of sampled data being generated every fourth predetermined period that is different from the first predetermined period, and suspend reception of the audio signal with the specified pause timing; an encoding unit operable to receive a set of sampled data from the audio signal sampling unit every fourth predetermined period, and encode the received set of sampled data to generate audio data corresponding to one audio sampling cycle; a fractional data holding unit operable to hold a set of sampled data which corresponds to a time shorter than the fourth predetermined period when the audio signal sampling unit suspends the reception of the audio signal. The audio signal sampling unit may resume receiving the audio signal with the specified pause release timing, sample the received audio signal to generate a set of sampled data, join the generated set of sampled data and the held set of sampled data together to produce a set of sampled data corresponding to one audio sampling cycle, output the produced set of sampled data, and thereafter output a set of sampled data corresponding to one audio sampling cycle every fourth predetermined period.

For this construction, audio data smaller than a predetermined size is held during the recording pause, so that no time lag occurs between images and sound recorded after the suspension is released.

Here, the audio data generating unit may contain a muting unit operable to lower a sound intensity of the audio signal before reception of the audio signal is suspended, and to restore the sound intensity before the reception of the audio signal is resumed.

With this construction, unnecessary noise is not generated when a recorded part corresponding to the recording pause is reproduced.

Here, the video signal received by the video data generating unit may correspond to a plurality of video frames. The video data generating unit may encode the received video signal using time correlation properties between some of the plurality of video frames, and generate a plurality of GOPs (groups of pictures). Each GOP may be video data corresponding to a plurality of video frames that are encoded with reference only to video frames in the same GOP. When suspending the reception of the video signal, the video data generating unit may complete generation of a GOP.

For this construction, generation of a GOP is completed immediately before the recording is suspended. Accordingly, a random access can be performed to the recorded MPEG System stream, such as when a reproduction in fast-forward mode or in fast-rewind mode, or a reproduction from a midpoint of the MPEG System stream is performed.

Here, the multiplexing/recording unit may generate system stream by multiplexing audio data and video data, and the system stream may be composed of a plurality of video object units (VOBUs). Each VOBU may be composed of at least one GOP and audio data related to the at least one GOP, and have a representation time shorter than a predetermined time. When suspending the recording, the multiplexing/recording unit may complete generation of a VOBU using video data, which has been generated by the video data generating unit using the video signal received before the specified pause timing, and audio data corresponding to a decoding order that is earlier than the decoding order corresponding to the used video data. The decoding order may be an order in which the decoder decodes the video data and the audio data. When resuming the recording, the multiplexing/recording unit may make video data, which has been generated by the video data generating unit immediately after the specified pause release timing, video data placed first in a VOBU that follows the VOBU generated when the recording is suspended.

For this construction, generation of a VOBU (video object unit) can be completed immediately before the recording is suspended, which enhances ease of operations of the present encoding/recording device when AV data is reproduced.

Here, the multiplexing/recording unit may generate a video object (VOB) composed of a plurality of VOBUs, and the VOB may contain a recording region into which a recording start time for the VOB should be written. When suspending the recording, the multiplexing/recording unit may complete generation of a VOB. When resuming the recording, the multiplexing/recording unit may newly generate a VOBU and a VOB, place the generated VOBU at a start of the generated VOB, and write a time at which the recording is resumed as a recording start time into a recording region in the generated VOB.

With this construction, generation of a VOB (video object) can be completed immediately before the recording is suspended, so that a suitable recording time can be written into a VOB recorded after the recording pause is released.

Here, when suspending the reception of the video signal, the video data generating unit may attach a sequence end code to an end of video data which has been generated from the received video signal. The sequence end code may indicate an end of video stream that is video data corresponding to a plurality of video frames.

For this construction, the video data generating unit inserts a sequence end code into an end of video data that is generated immediately before the recording is suspended. As a result, AV data can be recorded in conformity with the DVD-RAM standard.

Here, when suspending the recording, the multiplexing/recording unit may attach a sequence end code to an end of video data, which has been generated by the video data generating unit using the video signal received before the specified pause timing. The sequence end code may indicate an end of video stream that is video data corresponding to a plurality of video frames.

With this construction, the multiplexing/recording unit inserts a sequence end code into an end of video data that is recorded immediately before the recording is suspended. This allows AV data to be recorded in conformity with the DVD-RAM standard.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 1 shows a construction of a pack and a packet generated according to MPEG System.

FIG. 2 is a diagram showing a standard decoder for MPEG System stream.

FIG. 3A shows transition of a size of video data buffered in a video buffer in an MPEG decoder used when video data for a sequence of consecutive images is reproduced.

FIG. 3B shows transition of a size of video data buffered in the video buffer when video packets, which are not consecutive and have been joined together, are reproduced.

DESCRIPTION OF THE PREFERRED EMBODIMENT

1. Overview

The present embodiment relates to an encoding/recording device. When the user presses a pause key or the like on the present encoding/recording device, a recording pause instruction is issued. The encoding/recording device then suspends compression and encoding for video data simultaneously with sampling for an audio signal with a timing conforming to a video frame frequency. AV data recorded by the present encoding/recording device in this way can be continuously presented by an MPEG recorder without a time lag between images and sound being generated and without causing a video buffer in the MPEG recorder to malfunction.

2. Overall Construction

Figure 4:
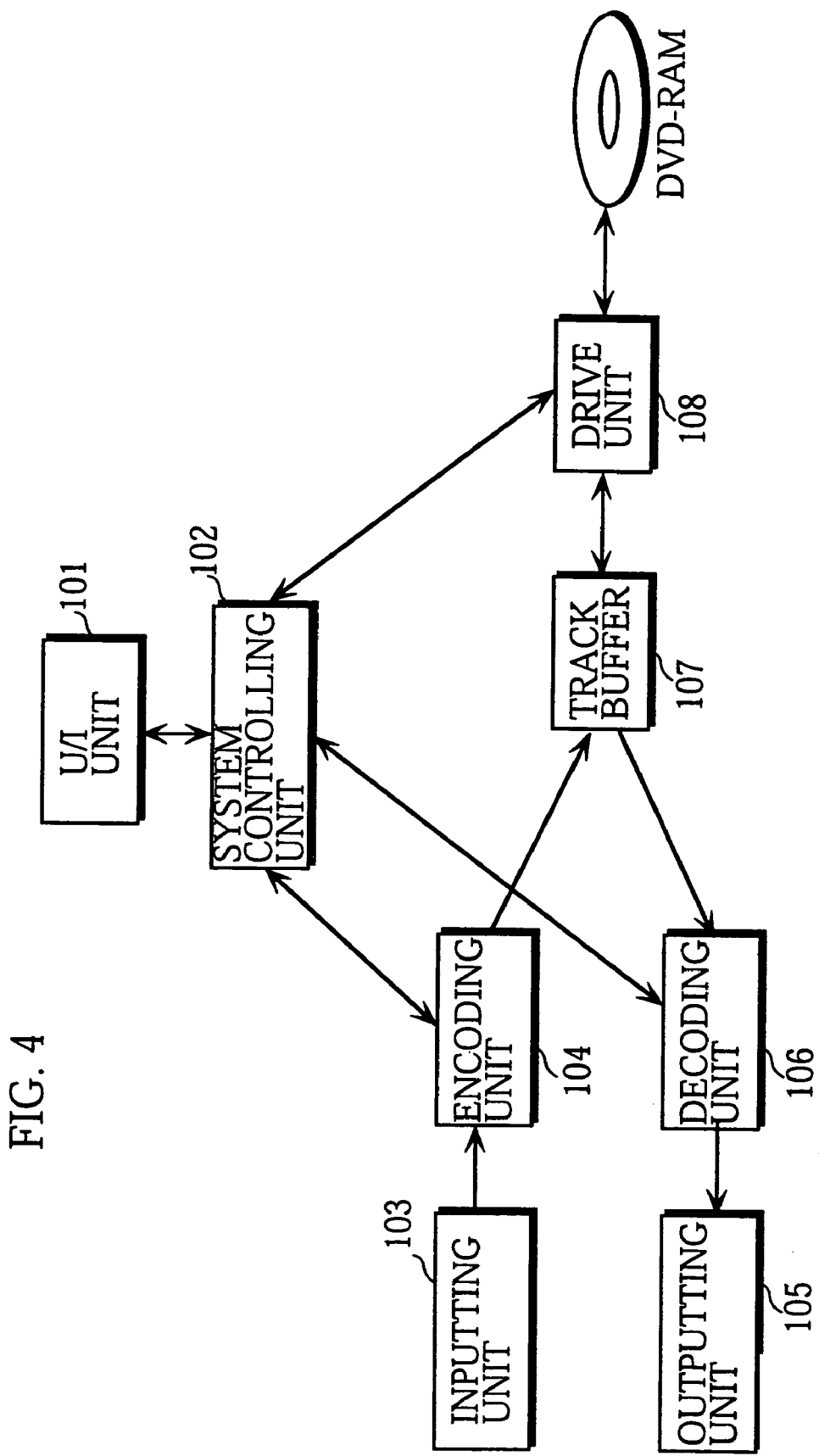
FIG. 4 shows a construction of a DVD recorder of the present embodiment according to the present invention.

FIG. 4 shows a construction of the encoding/recording device (hereafter called a DVD recorder) of the present embodiment.

The DVD recorder comprises a user interface (U/I) unit 101, a system controlling unit 102, an inputting unit 103, an encoding unit 104, an outputting unit 105, a decoding unit 106, and a track buffer 107, and a drive unit 108.

The U/I unit 101 is achieved by switches provided on the DVD recorder and a remote controller, for instance. The U/I unit 101 presents information to the user, receives an instruction from the user, and sends it to the system controlling unit 102.

The system controlling unit 102 is achieved by a microcomputer and a recording medium storing a control software program, for instance. The system controlling unit 102 receives the user instruction from the U/I unit 101, interprets the user instruction, and controls other units.

The inputting unit 103 is achieved by a digital video camera with a microphone, or a TV tuner, for example, and outputs a video frame and an audio signal to the encoding unit 104.

The encoding unit 104 includes the following elements: a video encoder that encodes an inputted video frame into video data; an audio encoder that performs sampling for the inputted audio signal to generate an audio frame, and encodes the audio frame to generate audio data; and a system encoder that multiplexes the generated video data and audio data into MPEG System stream.

The outputting unit 106 is achieved by a digital TV set, for instance, and outputs images and sound based on a video frame and an audio frame that has been generated.

The decoding unit 106 includes the following elements: a system decoder that specifies a type of each packet in MPEG System stream to output the packet accordingly; an audio decoder that receives audio data (a packet) from the system decoder and decodes the audio data to generate an audio signal; and a video decoder that receives video data (a packet) from the system decoder and decodes the video data to generate a video signal.

The track buffer 107 buffers MPEG System stream to absorb a time lag between the output/input by the encoding unit 104 and the output/input by the drive unit 108, and a time lag between the output/input by the decoding unit 106 and the output/input by the drive unit 108.

The drive unit 108 is a disk drive that controls a write and a read of MPEG System stream onto and from a DVD-RAM disc.

The following describes recording operations by the DVD recorder in FIG. 4.

The U/I unit 102 receives a recording start instruction from the user, and sends it to the system controlling unit 102.

The system controlling unit 102 then interprets the recording start instruction, and instructs the encoding unit 104 to start encoding.

On receiving the recording start instruction, the encoding unit 104 starts receiving a video frame and an audio signal from the inputting unit 103, generates MPEG System stream, and sends it to the track buffer 107.

When the track buffer 107 has accumulated MPEG System stream of a predetermined size, the system controlling unit 102 has the drive unit 108 to write the accumulated MPEG System stream onto the DVD-RAM disc.

If the U/I unit 101 receives a recording end instruction from the user at this point, the U/I unit 101 sends the instruction to the system controlling unit 102.

The system controlling unit 102 then interprets the recording end instruction, and instructs the encoding unit 104 to end the recording.

On receiving this recording end instruction, the encoding unit 104 stops receiving a video frame and an audio signal in conformity with a frame generation cycle for video frames, and generates MPEG System stream which includes an audio frame produced lastly using the received audio signal. The encoding unit 104 then sends the generated MPEG System stream to the track buffer 107, and notifies the system controlling unit 102 of the recording end.

On receiving the recording end notification, the system controlling unit 102 has the drive unit 108 record the MPEG System stream from the track buffer 107 to the DVD-RAM disc. The system controlling unit 102 also generates management information such as Video Object Information (VOBI) and Cell Information, and has the drive unit 108 record the generated management information onto the DVD-RAM disc.

If the user instructs, while the recording is performed, to suspend recording by pressing a pause key or the like on the DVD recorder, this recording pause instruction is sent to the U/I interface unit 101. The U/I interface unit 101 then sends the recording pause instruction to the system controlling unit 102.

The system controlling unit 102 then interprets the recording pause instruction, and instructs the encoding unit 104 to suspend encoding.

When receiving the encoding suspension instruction, the encoding unit 104 suspends reception of video frames, as a video frame corresponding to a video signal for which sampling was being performed when the encoding unit 104 received the encoding suspension instruction as the last video frame. As soon as the sampling for the last video frame is completed, the encoding unit 104 also suspends sampling for an audio signal, and generates MPEG System stream while completing generation of one Group of Pictures (GOP). Following this, the encoding unit 102 notifies the system controlling unit 102 of the encoding end.

On receiving the encoding end notification, the system controlling unit 102 has the drive unit 108 suspend a write of MPEG System stream from the track buffer 107 onto the DVD-RAM disc.

The above "GOP" is a group of pictures encoded with reference to one another, and is defined for MPEG video stream as a unit to which a random access can be performed such as when a reproduction in fast-forward mode or in fast-rewind mode, or a reproduction from a midpoint of MPEG System stream is performed. Such a random access within each GOP is possible because each picture within the GOP only refers to pictures of the same GOP.

Following this, when receiving a user instruction that releases the recording pause, the U/I unit 101 sends a pause release instruction to the system controlling unit 102.

The system controlling unit 101 then interprets the pause release instruction, and instructs the encoding unit 104 to release the recording pause.

On receiving the pause release instruction, the encoding unit 104 resumes reception of a video frame. As soon as the sampling for this video frame starts, the encoding unit 104 starts sampling for an audio signal, and notifies the system controlling unit 102 of the resumption of these operations.

On receiving this notification, the system controlling unit 102 has the drive unit 108 record MPEG System stream buffered in the track buffer 107 onto the DVD-RAM disc.

The reproduction processing by the present DVD recorder will not be described as it is not the essence of the present invention.

Figure 5:
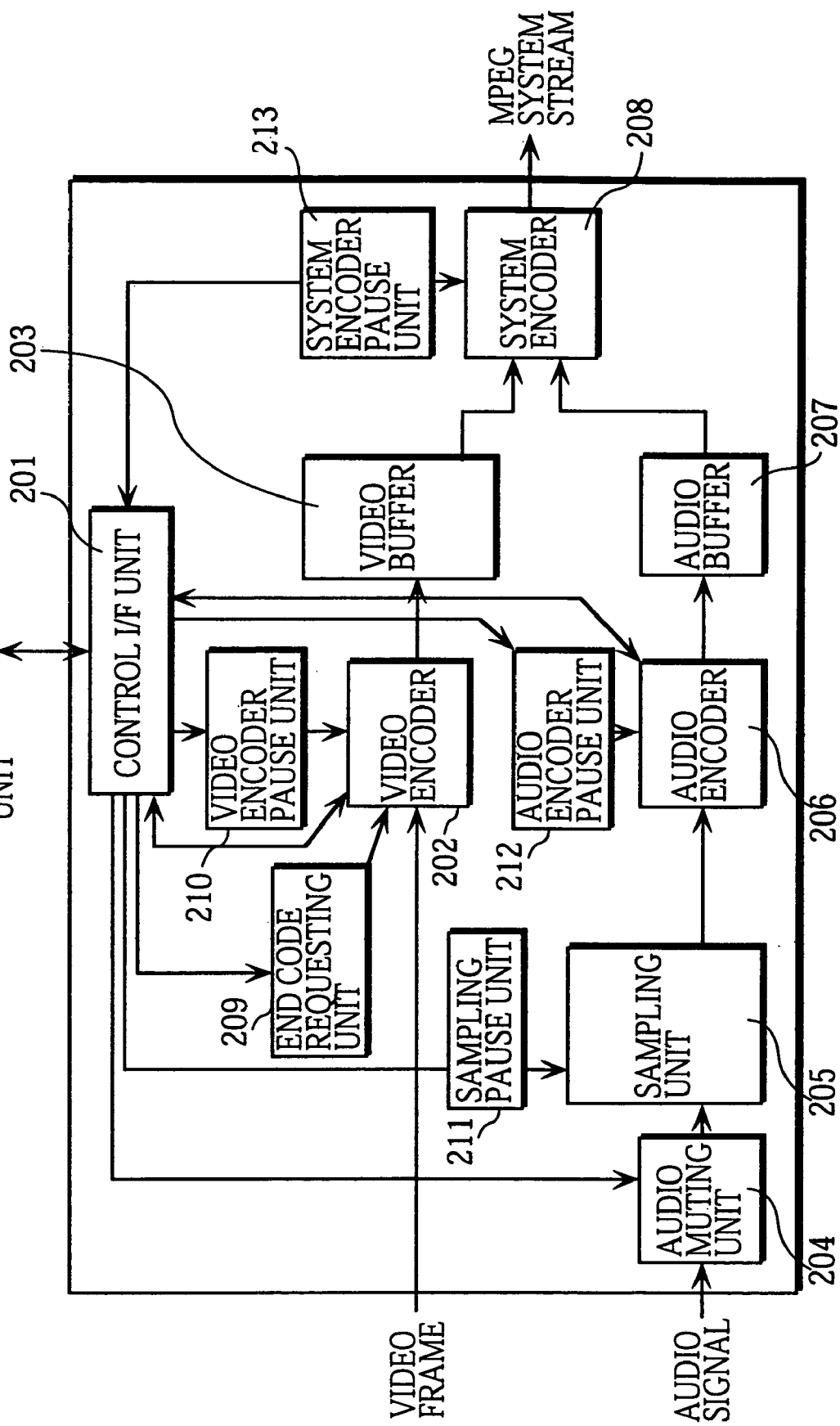
FIG. 5 shows a detailed construction of an encoding unit 104 in the DVD decoder.

FIG. 5 shows a detailed construction of the encoding unit 104.

The encoding unit 104 includes a control I/F unit 201, a video encoder 202, a video buffer 203, an audio muting unit 204, a sampling unit 205, an audio encoder 206, an audio buffer 207, a system encoder 208, an end code requesting unit 209, a video encoder pause unit 210, a sampling pause unit 211, an audio encoder pause unit 212, and a system encoder pause unit 213.

The control I/F unit 201 controls other elements of the encoding unit 104, and information transfer between the system controlling unit 102 and the other elements.

The video encoder 202 calculates an assumed amount of data to be accumulated in a virtual buffer of a virtual decoder (i.e., Video Buffering Verifier (VBV)) defined in MPEG, and stores calculated amounts as VBV buffer transition information. The video encoder 202 receives a video frame, encodes the received video frame into video data, and updates the VBV buffer transition information.

The video buffer 203 buffers video data generated by the video encoder 202.

In response to a recording pause instruction, the audio muting unit 204 starts muting an audio signal to be inputted to the sampling unit 205 by decreasing a sound intensity to around zero before the sampling unit 205 suspends the sampling for the audio signal. When the recording pause is released, the audio muting unit 205 restores the original sound intensity after the sampling unit 205 has resumed the sampling for the audio signal.

The sampling unit 205 receives an audio signal, and performs sampling for the audio signal to generate and output one audio frame corresponding to one sampling cycle in each audio frame generation cycle.

The audio encoder 206 receives an audio frame from the sampling unit 205, and encodes it into audio data.

The audio buffer 207 buffers audio data generated by the audio encoder 206.

Based on information regarding a size of each video frame that has been encoded by the video encoder 202 as a picture, the system encoder 208 obtains, from the video buffer 203, video data having a size equal to that of one video pack, and generates a video pack. This information is sent by the video encoder 202. The system encoder 208 also obtains, from the audio buffer 207, an audio frame of a size that is suitable to have one audio pack generated, based on information regarding a playback time of the audio frame. Based on the VBV buffer transition information, the system encoder 208 specifies, for each video pack, a DTS value and an SCR value, which is information regarding a time at which the video pack is multiplexed so as to allow a video buffer of an MPEG decoder to operate in conformity with MPEG standard. Following this, the system encoder 208 multiplexes the generated audio packs and video packs to generate MPEG System stream in which these packs are positioned in appropriate order, while writing an SCR into a pack header of each pack.

The end code requesting unit 209 requests the video encoder 202 to generate a sequence end code and insert it into the end of a GOP.

The video encoder pause unit 210 has the video encoder 202 suspend generation of video data when a recording pause instruction is issued. The video encoder pause unit 210 also instructs the video encoder 202 to complete generation of one GOP, with a video frame, which corresponds to a video signal for which sampling was being performed when the video encoder 202 received the recording pause instruction, as a last frame to be contained in the GOP. When the recording pause is released, the video encoder pause unit 210 has the video encoder 202 start encoding a video frame, which has been first generated after the recording pause release instruction was issued, into video data. As a result, the video encoder 202 generates an I picture at a start of a new GOP.

In response to the recording pause instruction, the sampling pause unit 211 has the sampling unit 205 suspend sampling for an audio signal. At the same instant, the aforementioned last video frame has been generated. When this recording pause is released, the sampling pause unit 211 has the sampling unit 205 resume the sampling when sampling for a video frame is resumed.

In response to a recording pause instruction, the audio encoder pause unit 212 has the audio encoder 206 suspend generation of audio data. The audio encoder pause unit 212 also has the audio encoder 206 resume generating audio data when the recording pause is released.

In response to a recording pause instruction, the system encoder pause unit 213 has the system encoder 208 suspend generation of a video pack and an audio pack so that generation of MPEG System stream is also suspended. The system encoder pause unit 213 also has the system encoder 208 resume generating an audio pack and a video pack to generated MPEG System stream when the recording pause is released.

Figure 6:
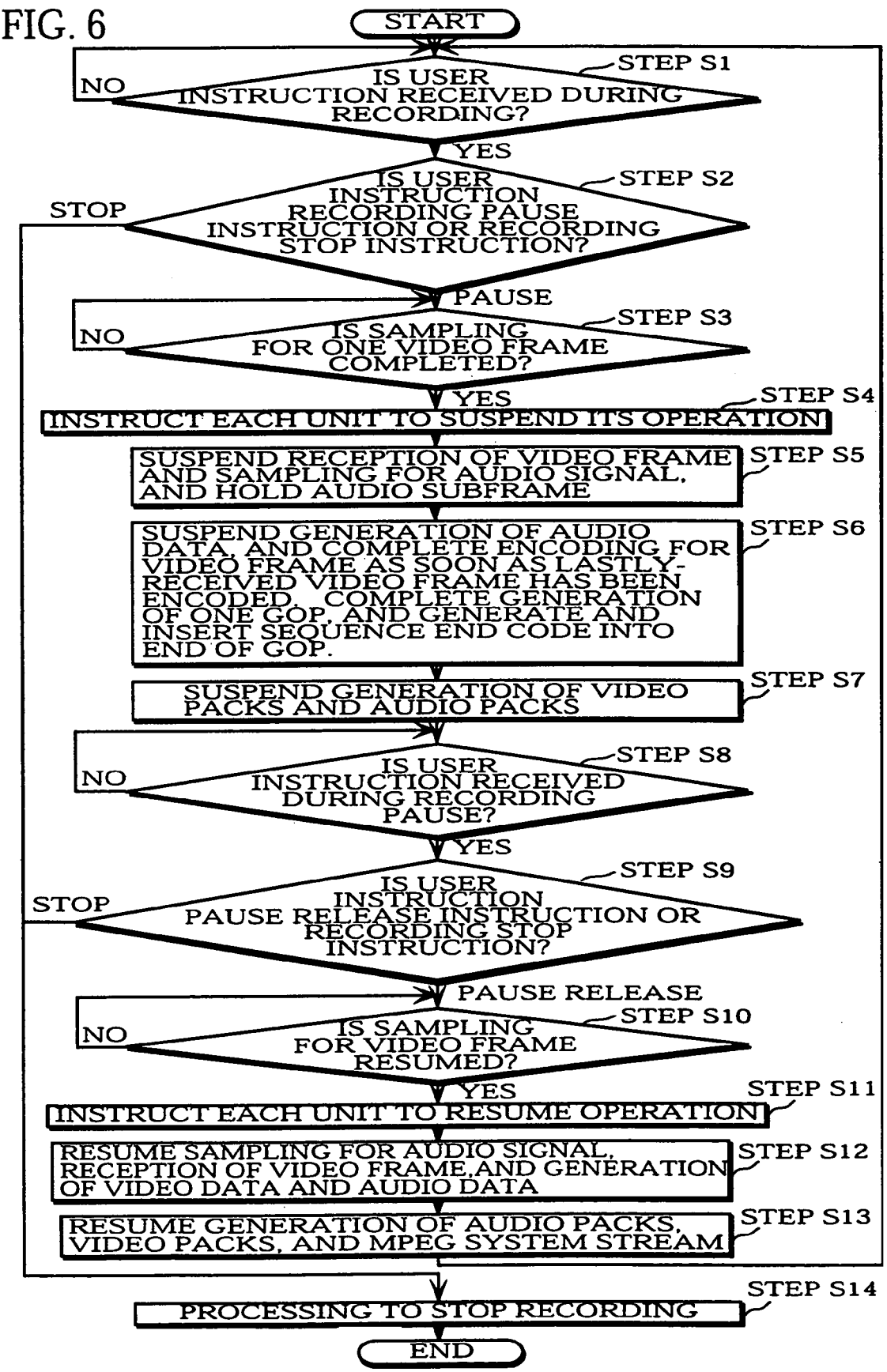
FIG. 6 shows the processing by the encoding unit 104 when it has received a recording pause instruction during recording, when the recording pause is released, and when the encoding unit 104 has received a recoding stop instruction.

FIG. 6 shows the processing by the encoding unit 104 when it has received a recording pause instruction during recording, when the recording pause is released, and when the encoding unit 104 has received a recoding stop instruction.

The following describes such processing with reference to FIGS. 5 and 6.

The control I/F unit 201 waits for a user instruction while the recording is performed (step S1).

On receiving the user instruction, the control I/F unit 201 specifies whether the user instruction is a recording pause instruction or a recording stop instruction (step S2).

If the user instruction is a recording pause instruction, the control I/F unit 201 waits until video signal sampling, which had been started when the recording pause instruction was received, is completed to generate a video frame (step S3).

As soon as this sampling has been completed, the control I/F unit 201 instructs the video encoder pause unit 210, the audio encoder pause unit 212, and the system encoder pause unit 213 to suspend generation of video data, audio data, and a video pack and an audio pack, respectively. The control I/F unit 201 also instructs the sampling pause unit 211 to suspend sampling for an audio signal (step S4).

The video encoder pause unit 210 then has the video encoder 202 suspend reception of a video frame. As soon as sampling to generate a video frame is completed, the sampling pause unit 211 has the sampling unit 205 suspend sampling for the audio signal. The sampling unit 205 then holds sound data (hereafter called an audio sub-frame) that is too small to form one audio frame during the recording pause (step S5).

The audio encoder pause unit 212 has the audio encoder 206 suspend generation of audio data. The video encoder 202 then receives the last video frame, and completes generation of one GOP. The end code requesting unit 209 then requests the video encoder 202 to generate and insert a sequence end code into the end of the generated GOP, so that the video encoder 202 generates and inserts it (step S6).

The system encoder pause unit 213 has the system encoder 208 suspend generation of a video pack, an audio pack, and MPEG System stream (Step S7).

The control I/F unit 201 waits for a user instruction while the recording is suspended (step S8).

On receiving the user instruction, the control I/F unit 201 specifies whether the user instruction is a recording pause release instruction or a recording stop instruction (step S9).

When specifying that the user instruction is a recording pause release instruction, the control I/F unit 201 waits until a time at which the sampling should be resumed to generate a video frame. (step S10).

When the time to resume the sampling to generate a video frame comes, the control I/F unit 201 instructs the video encoder pause unit 210, the audio encoder pause unit 212, and the system encoder pause unit 213 to resume generation of video data, audio data, and video packs and audio packs, respectively. The control I/F unit 201 also instructs the sampling pause unit 211 to resume sampling an audio signal (step S11)

In the moment that sampling for a video frame starts, the sampling pause unit 211 has the sampling unit 205 resume sampling an audio signal so that an audio subframe is generated. The sampling unit 205 then joins the generated subframe with the subframe that has been held during the recording pause, and outputs the joined subframes as one audio frame when the frame generation cycle for audio frames comes. Thereafter, the sampling unit 205 outputs one audio frame corresponding to one sampling cycle in every frame generation cycle. The audio encoder pause unit 212 also has the audio encoder 206 resume generation of audio data, and the video encoder pause unit 210 has the video encoder 202 resume reception of a video frame and generation of video data (step S12)

As soon as the video encoder 202 generates the video data, which is generated first after the recording pause instruction was released, the system encoder pause unit 213 has the system encoder 208 resume generating a video pack, an audio pack, and MPEG System stream (step S13). The control flow them returns to step S1, where a user instruction is awaited.

On the other hand, if the control I/F unit 201 specifies that the user instruction is a recording stop instruction in step S2 or S9, the following processing to stop the recording is performed.

The control I/F unit 201 stops the video encoder 202 from encoding a video frame as soon as the encoder 202 has completed encoding a video frame which it received immediately before the recording stop instruction is issued. At the same time, the control I/F unit 201 stops the audio encoder 206 from encoding an audio frame as soon as the encoder 206 has completed encoding of an audio frame which it received immediately before the recording stop instruction is issued. The control I/F unit 201 also has the sampling unit 205 abandon the stored subframe.

On completing encoding, the video encoder 202 and the audio encoder 206 notifies the control I/F unit 201 of the end of the encoding so that the control I/F unit 201 instructs the system encoder 208 to complete generation of MPEG System stream.

The system encoder 208 completes generation of MPEG System stream, using video data and audio data remaining in the video buffer 203 and the audio buffer 207.

Figure 7:
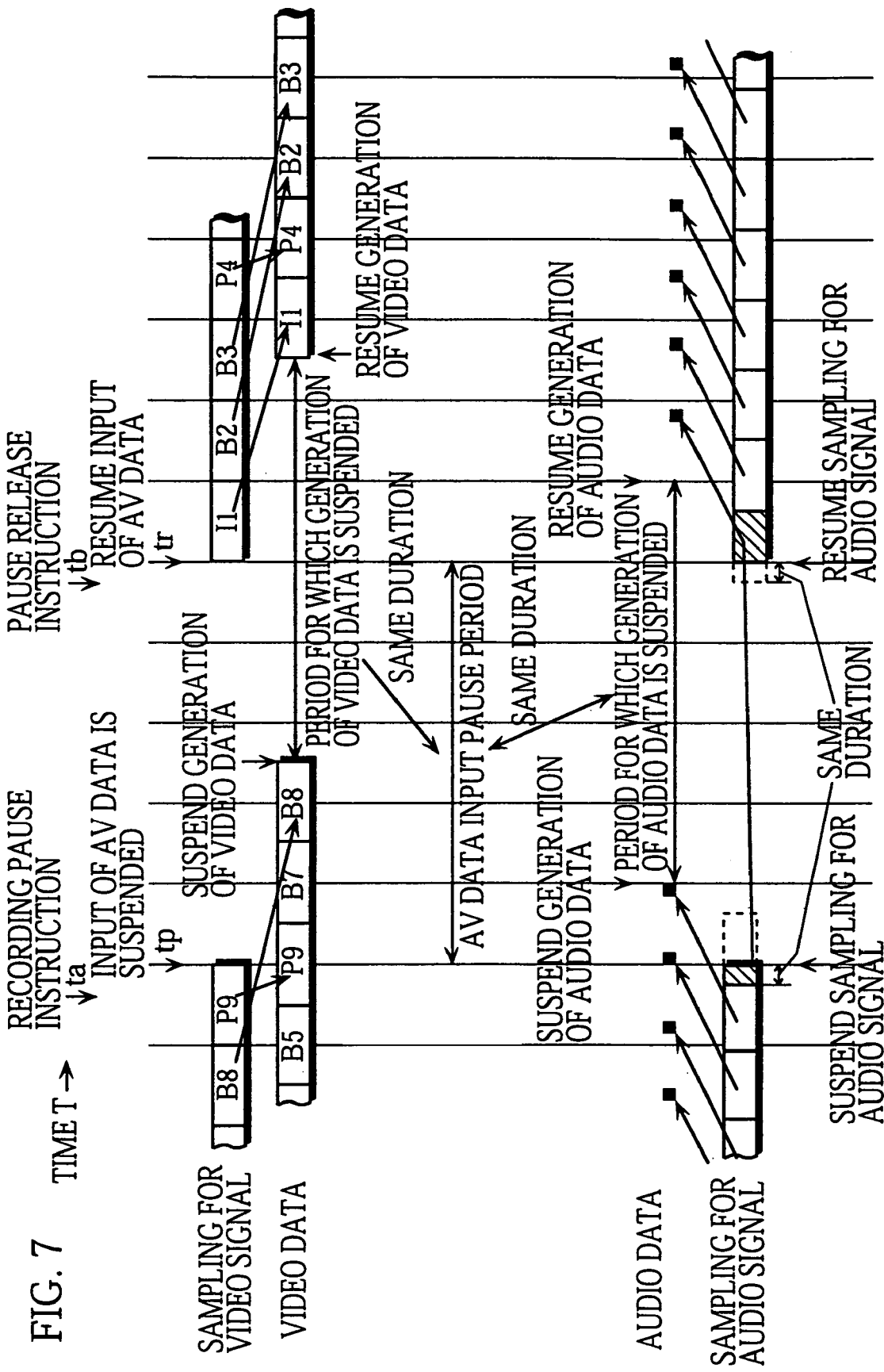
FIG. 7 is a timing chart that shows input and output timing of video data and audio data when the recording is suspended and then the recoding suspension is cleared.

FIG. 7 is a timing chart that shows input and output timing of video data and audio data when the recording is suspended and then the recoding suspension is cleared.

The user instructs to suspend recording at time "ta" in FIG. 7. As a result, sampling for a video signal is suspended at time "tp" as soon as sampling, which was being performed when the user instructed to suspend the recording, has been completed and a video frame has been generated. Simultaneously, sampling for an audio signal is also suspended.

The user then instructs to release the recording pause at time "tb". As a result, sampling for a video signal is resumed at time "tr" that is in a sampling cycle to generate a first video frame after the recording pause is released. Simultaneously, sampling for an audio signal is resumed. Accordingly, the input of AV data is suspended for a period between time "tp" and time "tr", and this period is hereafter called an "AV data input pause period".

The video encoder 202 suspends generation of video data as soon as it has completes encoding of a video frame which it has received at the time of the reception of the recording pause instruction. When a period that has the same duration as the aforementioned AV data input pause period has passed, the suspension of generation of video data is cleared as the video encoder 202 resumed encoding a video frame which it firstly received after the recording pause was cleared. The video encoder 202 holds the VBV buffer transition information during a period for which it suspends generation of video data, and uses the held VBV buffer transition information when resuming generation of video data.

The audio encoder 206 suspends generation of audio data in the moment it completes encoding of an audio frame (not an audio subframe) which it has received at the time of the reception of the recording pause instruction. When a period that has the same duration as the AV data input pause period has passed, the audio encoder 206 resumes encoding an audio frame which it has firstly received after the recording pause is released.

A uniform time is taken to perform sampling for an audio signal to generate an audio frame and encode the audio frame into audio data. As a result, a period for which the sampling for an audio signal is suspended becomes equal to a period for which the audio encoder 206 suspends generation of audio data.

The following describes how video data and audio data are held while recording is suspended.

Figure 8:
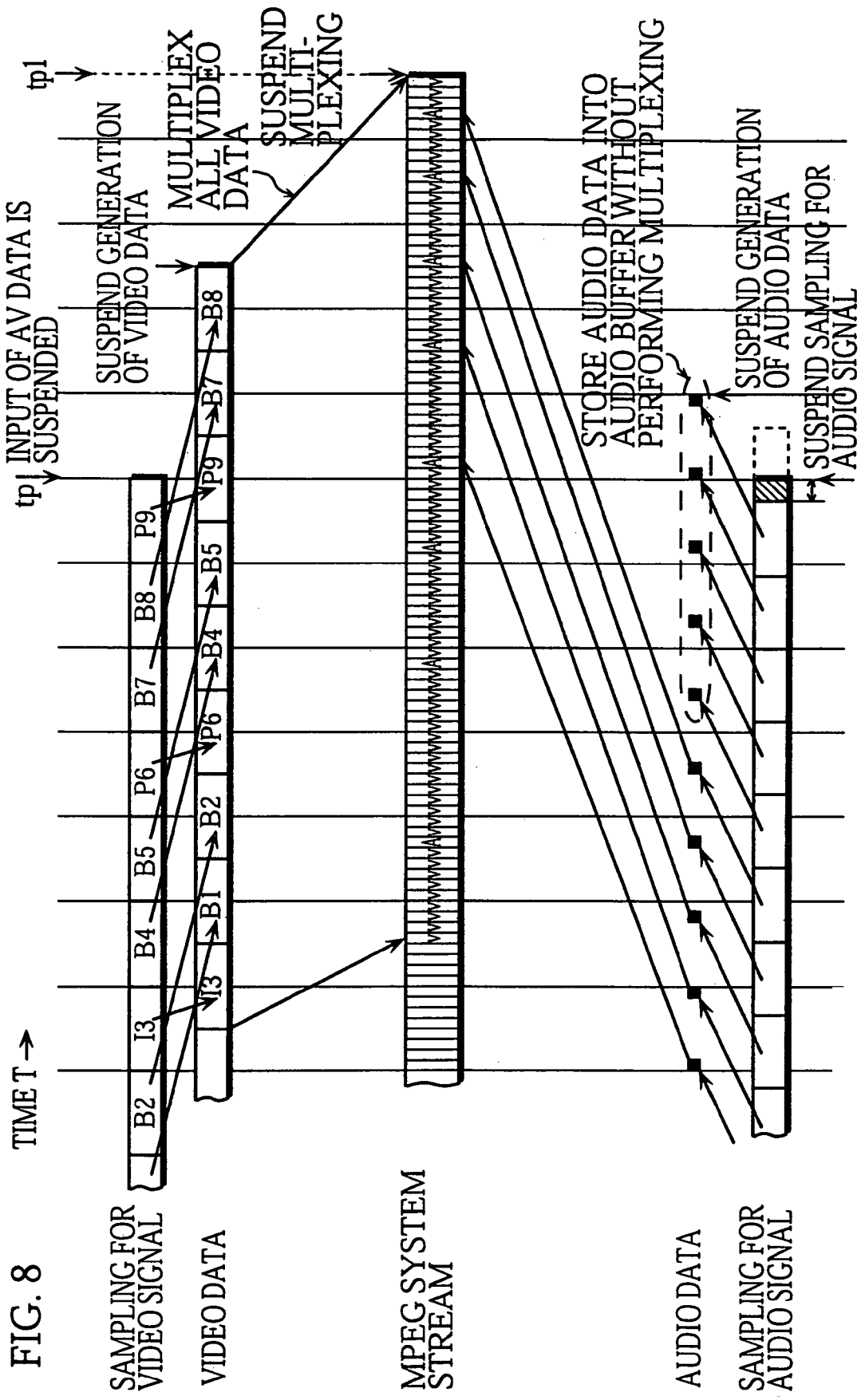
FIG. 8 shows, as one example, how video data and audio data are used when a recording pause instruction is issued.

FIG. 8 shows, as one example, how video data and audio data are used when the recording pause instruction is issued.

As shown in the figure, at time "tp1", generation of MPEG System stream is suspended.

The system encoder 208 continues to generate MPEG System stream even after the video encoder 202 has suspended generation of video data. The system encoder 208 suspends generation of MPEG System stream as soon as it has multiplexed all the video data remaining in the video buffer 207. On the other hand, audio data buffered in the audio buffer 207 is not multiplexed into the MPEG System stream, and held in the audio buffer 207 while the recording is suspended.

Figure 9:
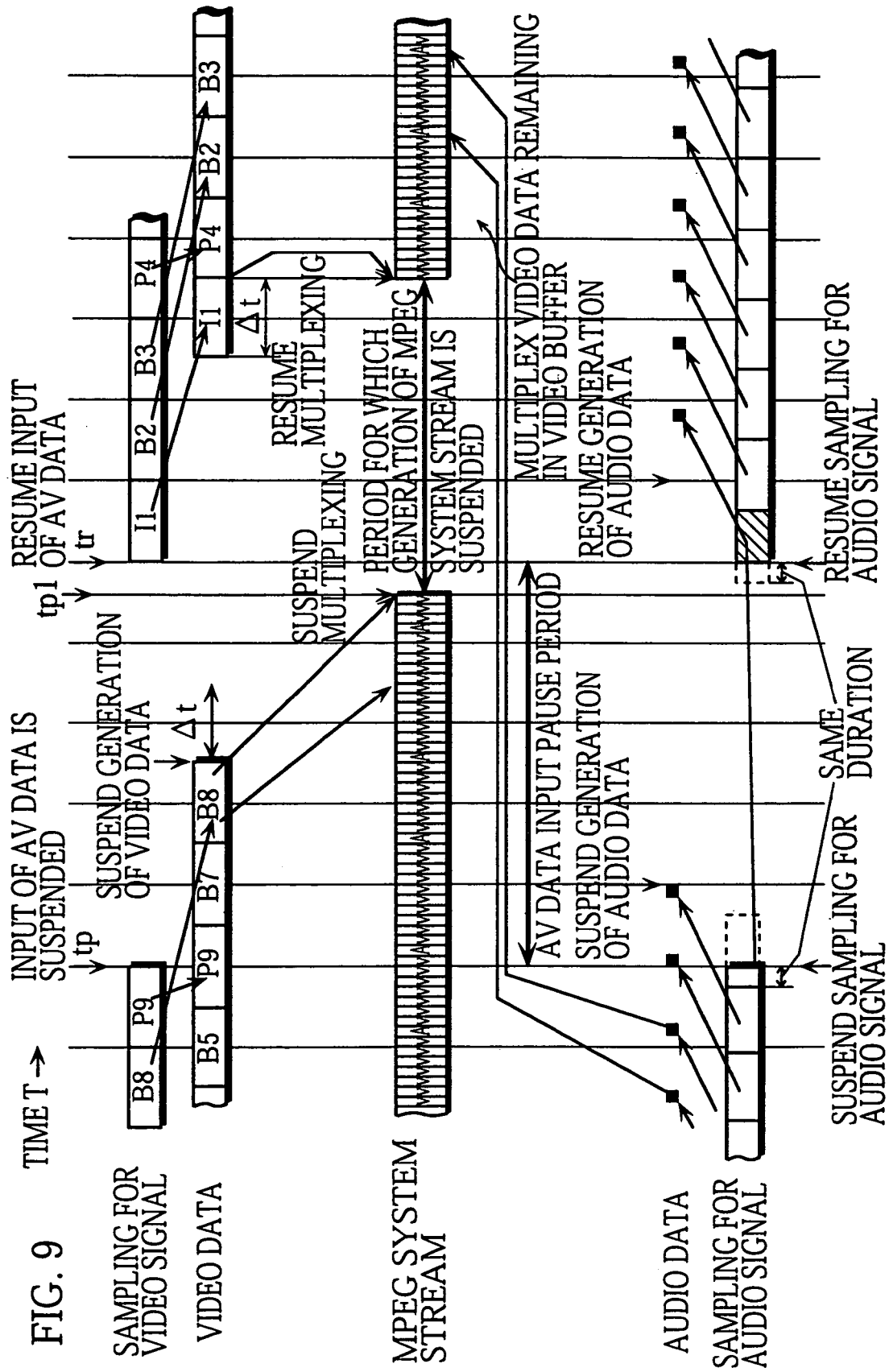
FIG. 9 shows how video data and audio data are used when a recording pause instruction is issued, as another example.

FIG. 9 shows how video data and audio data are used as one example.

As shown in the figure, generation of MPEG System stream is suspended during a period that has the same duration as a period for which AV data input is suspended. As a result, a time lag between an image and sound, which are recorded after the recording pause can be prevented from being generated.

Note that a timing with which the system encoder 208 suspends generation of MPEG System stream is not limited to the above examples. For instance, the system encoder 208 may suspend generation of MPEG System stream as soon as the video encoder 202 has suspended generation of video data, or before the system encoder 208 completes multiplexing of all the video data remaining in the video buffer 203.

Also, a timing with which the audio encoder 206 suspends generation of audio data is not limited to the above examples. For instance, the audio encoder 206 may suspend generation of audio data as soon as the video encoder 202 has suspended generation of video data, or before encoding all the audio frames which have been obtained before sampling was completed for a video signal, for which sampling was being performed when the recording pause instruction was issued.

Figure 10:
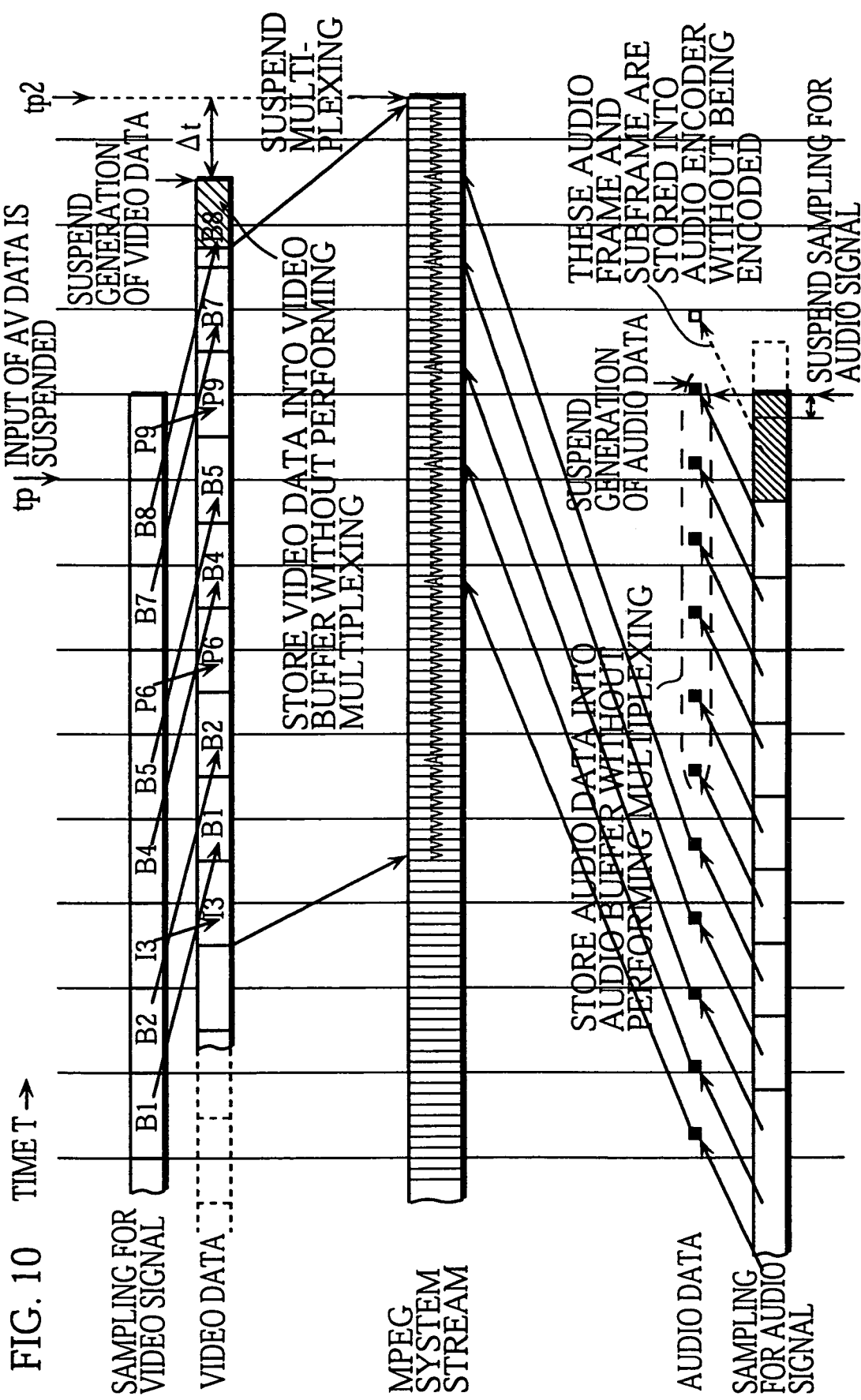
FIG. 10 shows how video data and audio data are used when a recording pause instruction is issued, as another example.

FIG. 10 shows, as another example, how video data and audio data generated by the video encoder 202 and the audio encoder 206 are used.

As shown in the figure, the system encoder 208 suspends generation of MPEG System stream at time "tp2" after time "Δt" has passed since the video encoder 202 suspended generation of video data. This time "Δt" is defined in a local standard for the present DVD recorder, and has the same duration as one video frame generation cycle in this example.

The system encoder 208 continues to generate MPEG System stream even after the video encoder 202 has suspended generation of video data, and suspends generation of the stream at time tp2, which is before it finishes multiplexing all the video data remaining in the video buffer 203. The generated video data and audio data that have not been multiplexed remain to be stored in the video buffer 203 and the audio buffer 207 while the recording is suspended.

The audio encoder 206 suspends generation of audio data before finishing encoding all the audio frames which it has received before the recording pause instruction was issued.

The following describes how video data and audio data are used after the recording pause is released.

Figure 11:
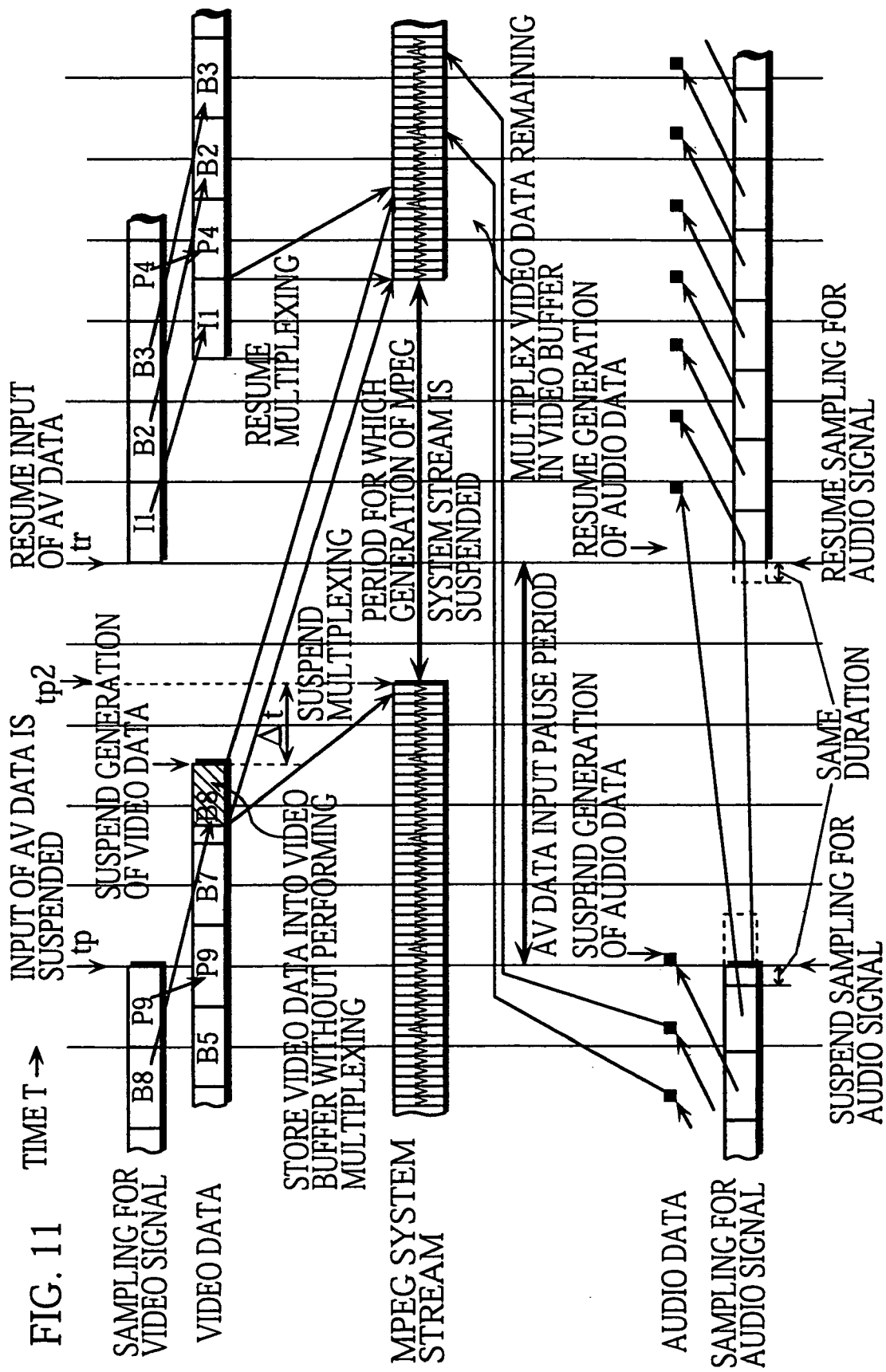
FIG. 11 shows, as another example, how video data and audio data are used before and after a recording pause.

FIG. 11 shows, as one example, how video data and audio data are used before and after the recording pause.

As shown in the figure, sampling for the video signal and the audio signal is suspended for the same period. In addition, all the video data and audio data generated by encoding the video signal and the audio signal which were sampled before and after the recording pause is multiplexed into an MPEG System stream. This can prevent a time lag from being generated between images and sound which are recorded before and after the recording pause.

Also, the system encoder 208 suspends generation of MPEG System stream when about one video frame generation cycle has passed since the video encoder 202 suspended generation of video data. The system encoder 208 then resumes generating MPEG System stream when about one video frame generation cycle has passed since the video encoder 202 resumed generation of video data. As a result, the system encoder 208 suspends generation of MPEG System stream for a period having the same duration as a period for which input of AV data is suspended.

Figure 12:
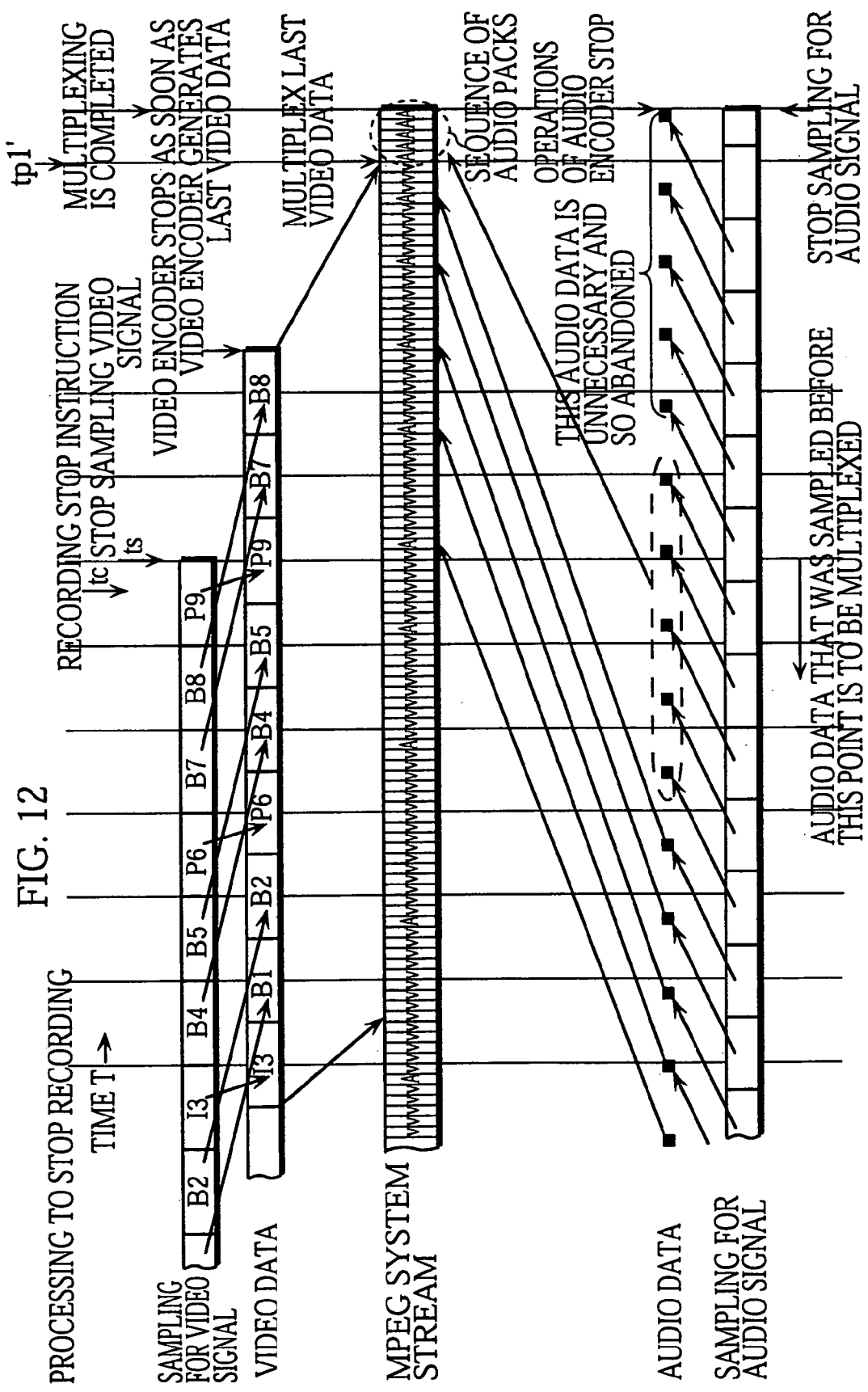
FIG. 12 shows how video data and audio data are used when a recording stop instruction is issued during recording.

FIG. 12 shows how video data and audio data are used when a recording stop instruction is issued during recording.

As shown in the figure, in response to the recording stop instruction issued at time "tc", sampling for a video signal stops at "ts" as soon as sampling, which was being performed at time "tc" to generate a video frame, has been completed.

The video encoder 202 stops generating video data when it has encoded all the video frames which it received before sampling for a video signal was suspended.

The system encoder 208 continues to generate MPEG System stream even after the video encoder 202 stops generating video data. On multiplexing all the video data remaining in the video buffer 203, the system encoder 208 stops the multiplexing. The system encoder 208 also multiplexes audio data, which has been generated by the audio encoder 206 using audio frames generated before the time "ts", into the MPEG System stream.

Accordingly, when recording operation stops in response to the recording stop instruction, the resulting MPEG System stream contains a sequence of audio packs in the end of the stream.

As soon as the system encoder 208 stops the multiplexing, the sampling unit 205 and the audio encoder 206 stop operating. The audio encoder 206 discards audio data generated from audio frames, which have been generated after time "ts".

Figure 13:
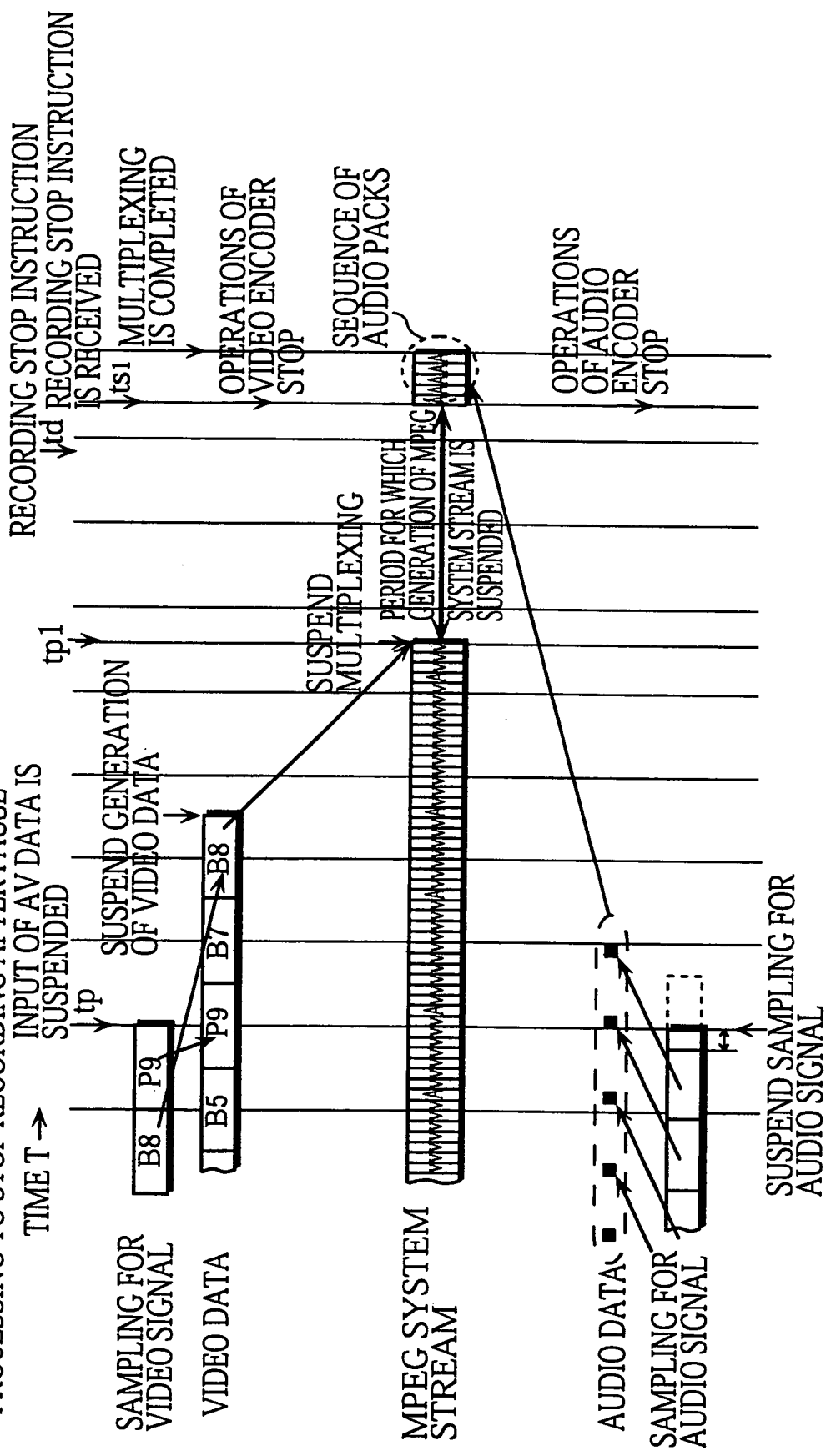
FIG. 13 shows how video data and audio data are used when a recording stop instruction is issued while recording is suspended as shown in FIG. 8.

FIG. 13 shows how video data and audio data are used when a recording stop instruction is issued while recording is suspended as shown in FIG. 8.

When the user instructs to stop the recording at time "td", the system encoder 208 receives the recording stop instruction at time "ts1", and starts multiplexing all the audio data remaining in the audio buffer 207 into MPEG System stream, and completes the multiplexing. The resulting MPEG System stream contains a sequence of audio packs in the end of the stream.

Figure 14:
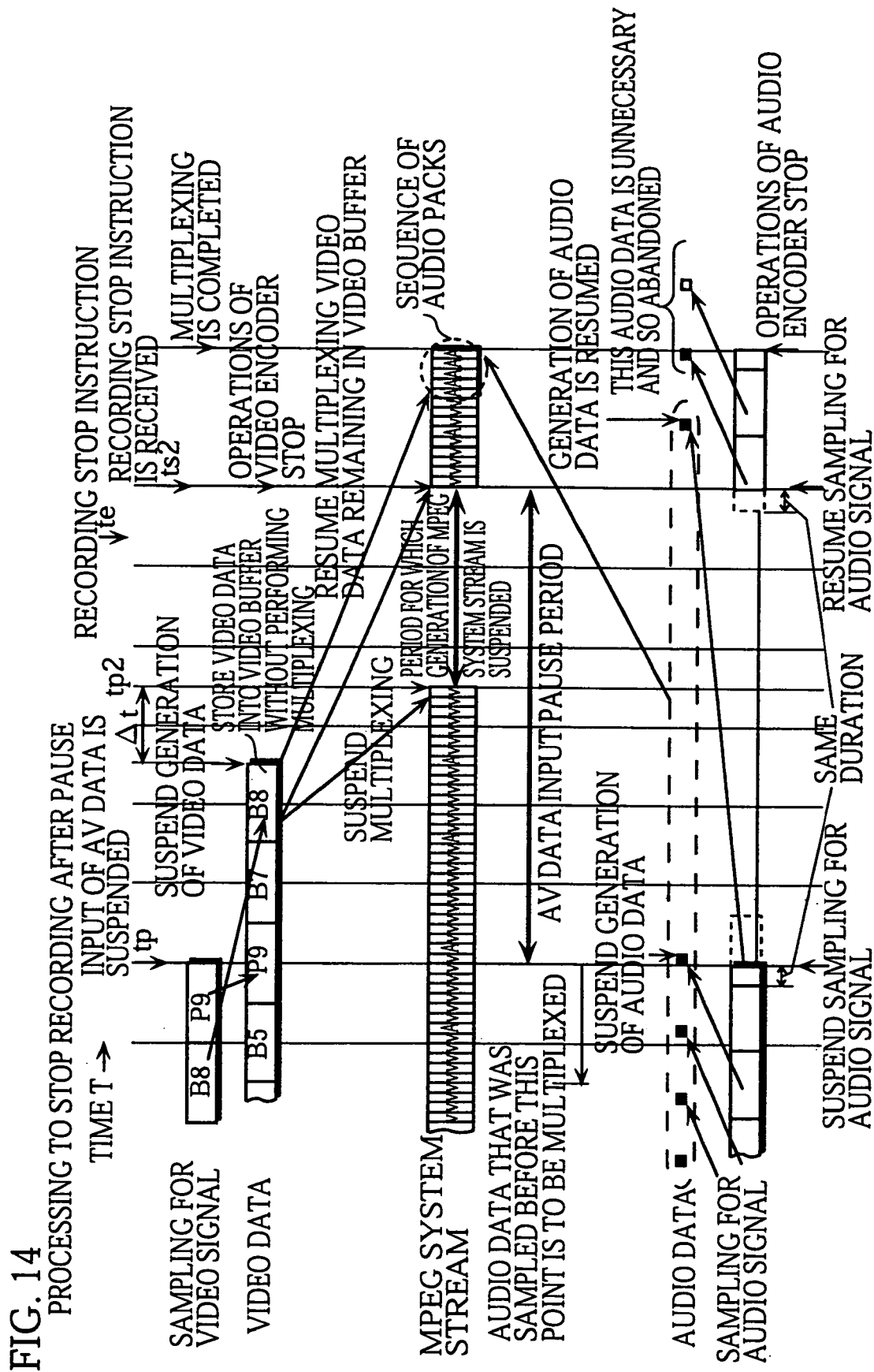
FIG. 14 shows how video data and audio data are used when a recording stop instruction is issued while recording is suspended as shown in FIG. 10.

FIG. 14 shows how video data and audio data are used when a recording stop instruction is issued while recording is suspended as shown in FIG. 10.

When the user instructs to stop the recording at time "te", the system encoder 208 receives the recording stop instruction at time "ts2", and then resumes multiplexing using all the audio data and video data remaining in the audio buffer 207 and the video buffer 203.

The audio encoder 206 also resumes generating audio data. The system encoder 208 multiplexes all the audio data, which has been generated by the audio encoder 206 using audio frames which it received before suspending generation of audio data, into the end of the MPEG System stream, and completes the multiplexing.

Video data recorded after the recording pause often corresponds to the start of a program or a take, and therefore the user may search for this certain video data more often than he searches for other video data for reproduction. For DVD-RAM, address search within a VOB is performed using Video Object Unit (VOBU) Time Map Information (TMAPI). Accordingly, it is desirable to insert a video pack, which contains the start of a GOP generated immediately after the recording pause has been released, into a VOBU as the first video pack in order to allow the user to effectively search for video data recorded after the recording pause is released.

Accordingly, when the user instructs to suspend the recording, the system encoder 208 completes generation of one VOBU using video data, which the video encoder 202 has generated using a video signal inputted before the recording suspend instruction is issued, and using audio data which is multiplexed before this video data. When the user instructs to release the suspension and the system encoder 202 resumes generation of packs, the system encoder 202 inserts a video pack, which contains the start of video data generated by the video encoder 202 immediately after the suspension is released, into the start of a VOBU.

Here, a VOB is MPEG System stream and is composed of a plurality of VOBUs, and each VOBU is a set of data that has a construction of MPEG System stream into which at least one GOP and a plurality of audio packs are multiplexed.

However, recording AV data before and after the recording pause as different VOBUs involves the following problem in relation to the DVD-RAM standard.

Video Object Information (VOBI) defines an entry "VOB#REC#Time", and a recording start time for one VOB is recorded in this entry which is present at a start of the VOBI. Accordingly, when different pieces of stream before and after a recording pause are recorded as one VOB, these pieces of stream have the same "VOB#REC#Time". However, this is not desirable as these pieces of stream are not recorded in one continuous period.

Accordingly, the system encoder 208 completes generation of one VOB when suspending generation of packs in response to a recording suspend instruction. When resuming generation of packs in response to a recording pause release instruction, the system encoder 208 inserts a VOBU generated immediately after the suspension is released into a new VOB, and records a time at which the suspension was released into the start of the new VOB as the entry "VOB#REC#Time".

It is also defined by the DVD-RAM standard that a sequence end code "0x000001B7 (hexadecimal)" should be inserted into the end of a GOP generated immediately before a recording pause if AV data before and after the recording pause is recorded as different VOBs. This sequence end code shows the end of MPEG System video stream. An ordinary video encoder has a function to generate a sequence end code.

The end code requesting unit 209 therefore instructs the video encoder 202 to generate a sequence end code so that the video encoder 202 generates a sequence end code and inserts it into the end of a GOP generated immediately before the recording pause.

Figure 15:
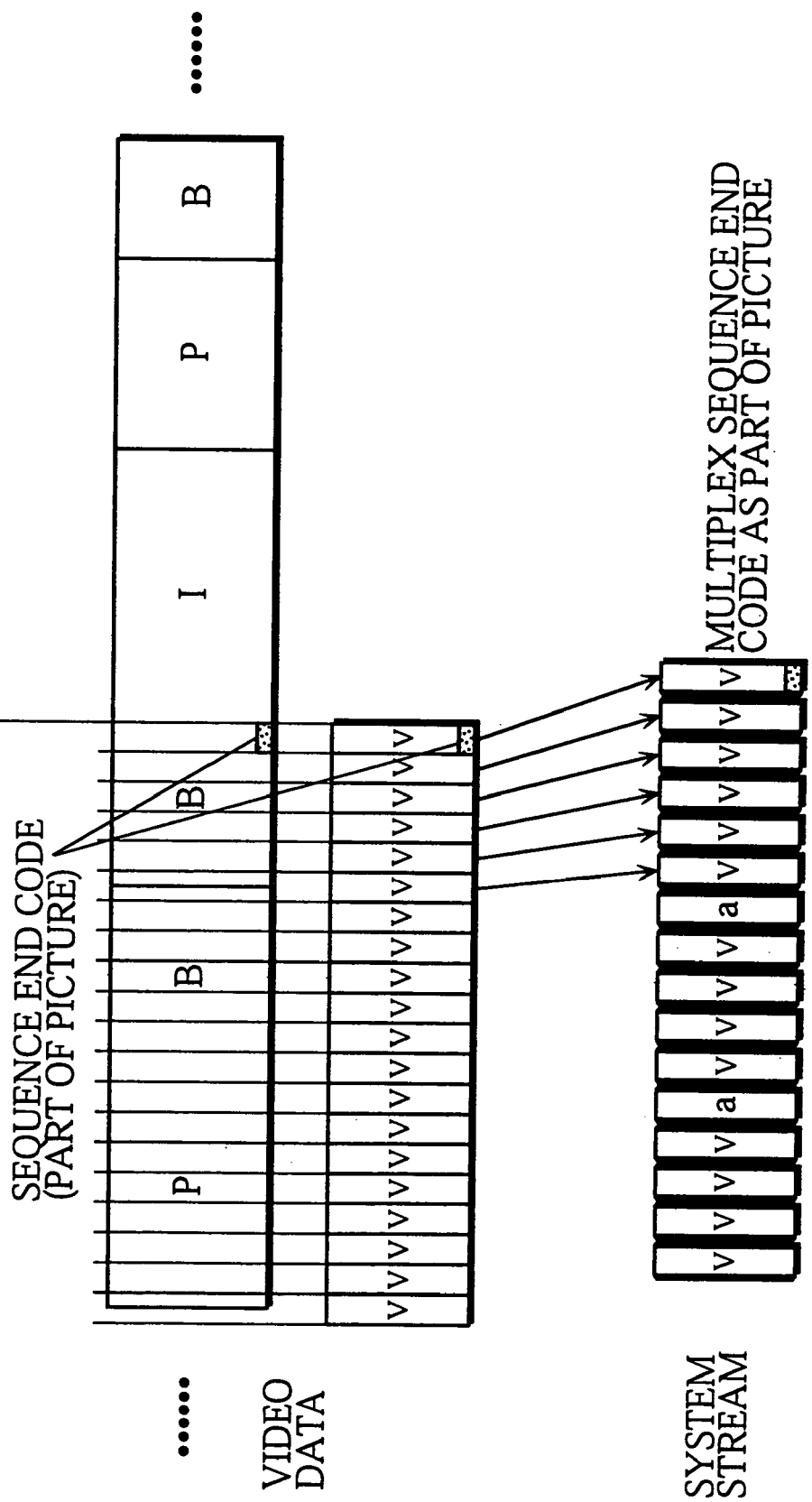
FIG. 15 shows a sequence end code inserted into the end of a GOP generated immediately before the suspension.

FIG. 15 shows a sequence end code inserted into the end of a GOP generated immediately before the suspension.

As shown in the figure, the video encoder 202 regards the sequence end code as a part of the GOP (video data) when counting a generated bit size. As a result, the system encoder 208 does not need to consider a bit size (32 bits) of the sequence end code.

Note that the above generation and insertion of a sequence end code do not have to be performed by the video encoder 202, and may be performed by the system encoder 208, for instance.

Figure 16:
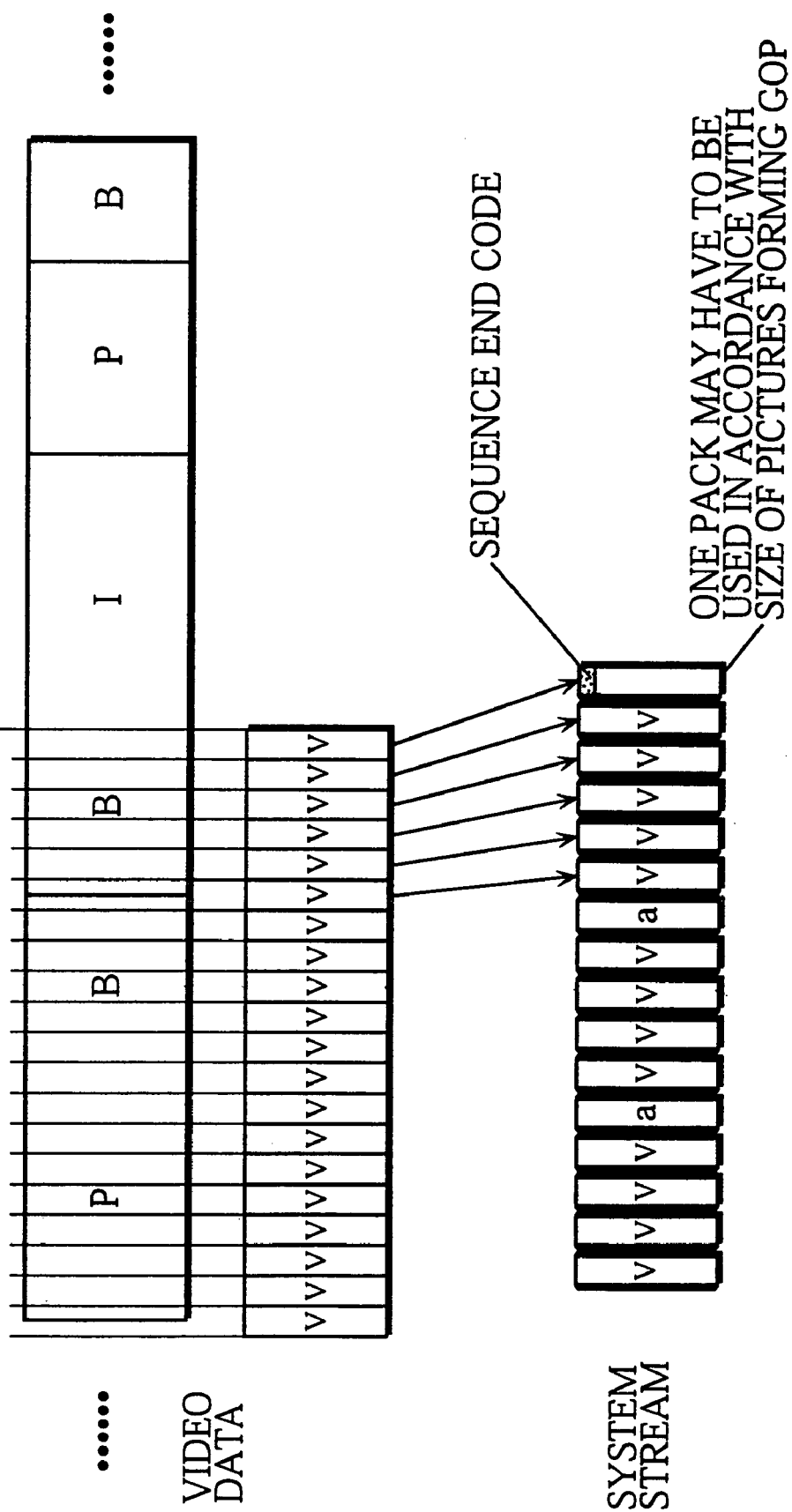
FIG. 16 shows a state in which a system encoder 208 inserts a sequence end code into an end of a GOP generated immediately before a recording pause.

FIG. 16 shows a state in which the system encoder 208 inserts a sequence end code into the end of a GOP generated immediately before a recording pause.

As can be understood from the figure, the end code requesting unit 209 is no longer necessary in this case although it is necessary for the system encoder 208 to consider an increase by the bit size (32 bits) of the sequence end code when generating packs. In some cases, a new pack for storing the sequence end code may have to be generated.

As has been described, on receiving a recording pause instruction, the encoding/recording device of the present invention suspends operations of the video encoder with a timing conforming to a video frame generation cycle. When the recording pause is released, the encoding/recording device has the video encoder resume the operations. This video encoder generates video data while considering transition in a size of data accumulated in a video buffer of an MPEG decoder in every video frame generation cycle. Accordingly, video data recorded by the present encoding/recording device can be continuously reproduced without the video buffer in the MPEG decoder being damaged.

In addition, the present encoding/recording device suspends operations of the video encoder simultaneously with sampling for an audio signal. When having the video encoder resume its operations, the encoding/recording device simultaneously has sampling for an audio signal resumed. As a result, audio data recorded by this encoding/recording device can be reproduced without a time lag between images and sound being generated.

The above embodiment has been used to describe the present invention although it should be clear that the present invention is not limited to these embodiments. This is to say, computer programs to have a computer perform the processing of the above embodiment may be recorded on computer-readable recording media to be distributed and sold. These recording media can be, for instance, a floppy disc, a compact disc, a magnet-optical disc, a DVD disc, and a memory card, all of which allow the user to load into and remove from a computer. The recording media may be also hard disk, semiconductor memory, or the like that are provided in a computer in advance.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. An encoding/recording device comprising:
  a video data generating unit operable to encode a video signal every first predetermined period, to generate video data;
  an audio data generating unit operable to encode an audio signal every second predetermined period, to generate audio data;

a multiplexing/recording unit operable to multiplex the video data and the audio data, to generate a system stream, and record the system stream onto a predetermined recording medium;

a pause controlling unit operable to, when receiving a pause instruction during recording, control the video data generating unit, the audio data generating unit, and the multiplexing/recording unit, so that the multiplexing/recording unit completes a system stream that is generated when the pause instruction is received, and records the system stream; and a pause release controlling unit operable to, when receiving a pause release instruction, control the video data generating unit, the audio data generating unit, and the multiplexing/recording unit, so that the multiplexing/recording unit starts to generate a new system stream, wherein under control of the pause controlling unit, the audio data generating unit suspends the generation of the audio data after lowering a sound intensity of the audio signal, and under control of the pause release controlling unit, the audio data generating unit restores the sound intensity after resuming the generation of the audio data.

2. The encoding/recording device of claim 1, wherein the video data generating unit encodes the video signal according to MPEG (Moving Picture Expert Group).

3. The encoding/recording device of claim 1, wherein every first predetermine period, the video data generating unit receives a video signal that corresponds to one video frame, when receiving the pause instruction during the recording, the pause controlling unit specifies a pause timing that is synchronous to a boundary of a first predetermined period, when receiving the pause release instruction, the pause release controlling unit specifies a pause release timing that is synchronous to a boundary of a first predetermined period, the video data generating unit suspends the generation of the video data with the specified pause timing, and resumes the generation of the video data with the specified pause release timing, and the audio data generating unit suspends the generation of the audio data with the specified pause timing, and resumes the generation of the audio data with the specified pause release timing.

4. The encoding/recording device of claim 3, wherein under control of the pause controlling unit, the multiplexing/recording unit suspends the multiplexing and the recording after a second predetermined period has passed since the specified pause timing, and under control of the pause release controlling unit, the multiplexing/recording unit resumes the multiplexing and the recording after the second predetermined period has passed since the specified pause release timing.

5. The encoding/recording device of claim 4, wherein after a third predetermined period has passed since the specified pause timing, the video data generating unit completes encoding for the video signal which has been received before the specified pause timing, and the second predetermined period for the multiplexing/recording unit is a sum of the first predetermined period and the third predetermined period.

6. The encoding/recording device of claim 3, wherein under control of the pause controlling unit, the multiplexing/recording unit suspends the multiplexing and the recording after having multiplexed and recorded all the video data generated by the video data generating unit.

7. The encoding/recording device of claim 6, wherein when suspending the multiplexing and the recording, the multiplexing/recording unit holds audio data that has not been multiplexed and recorded, and under control of the pause release controlling unit, the multiplexing/recording unit resumes the multiplexing and the recording by starting multiplexing and recording the held audio data and video data generated after the specified pause release timing.

8. An encoding/recording method comprising:
a video data generating step of encoding a video signal every first predetermined period, to generate video data;

an audio data generating step of encoding an audio signal every second predetermined period, to generate audio data;

a multiplexing/recording step of multiplexing the video data and the audio data, to generate a system stream, and recording the system stream onto a predetermined recording medium;

a pause controlling step of, when a pause instruction is received during recording, controlling operations in the video data generating step, the audio data generating step, and the multiplexing/recording step, so that a system stream that is generated when the pause instruction is received is completed, and recorded; and a pause release controlling step of, when a pause release instruction is received, controlling the operations in the video data generating step, the audio data generating step, and the multiplexing/recording step, so that a new system stream starts to be generated, wherein in the audio data generating step under control of operations in the pause controlling step, the generating of the audio data is suspended after a sound intensity of the audio signal is lowered, and in the audio data generating step under control of operations in the pause release controlling step, the sound intensity is restored after the generation of the audio data is resumed.

9. The encoding/recording method of claim 8, wherein in the video data generating step, the video signal is encoded according to MPEG (Moving Picture Expert Group).

10. The encoding/recording method of claim 8, wherein every first predetermine period, a video signal that corresponds to one video frame is received in the video data generating step, when the pause instruction is received during the recording, a pause timing that is synchronous to a boundary of a first predetermined period is specified in the pause controlling step, when the pause release instruction is received, a pause release timing that is synchronous to a boundary of a first predetermined period is specified in the pause release controlling step, the generation of the video data in the video data generating step is suspended with the specified pause timing, and resumed with the specified pause release timing, and the generation of the audio data in the audio data generating step is suspended with the specified pause timing, and resumed with the specified pause release timing.

11. The encoding/recording method of claim 10, wherein
in the multiplexing/recording step under control of operations in the pause controlling step, the multiplexing and the recording is suspended after a second predetermined period has passed since the specified pause timing, and
in the multiplexing/recording step under control of the operations in the pause release controlling step, the multiplexing and the recording is resumed after the second predetermined period has passed since the specified pause release timing.

12. The encoding/recording method of claim 11, wherein
after a third predetermined period has passed since the specified pause timing, encoding for the video signal which has been received before the specified pause timing is completed in the video data generating step, and
the second predetermined period for the multiplexing/recording step is a sum of the first predetermined period and the third predetermined period.

13. The encoding/recording method of claim 10, wherein
in the multiplexing/recording step under control of operations in the pause controlling step, the multiplexing and the recording is suspended after all the video data generated in the video data generating step has been multiplexed and recorded.

14. The encoding/recording method of claim 13, wherein
when the multiplexing and the recording is suspended, audio data that has not been multiplexed and recorded is held in the multiplexing/recording step, and
in the multiplexing/recording step under control of operations in the pause release controlling step, the multiplexing and the recording is resumed by starting multiplexing and recording the held audio data and video data generated after the specified pause release timing.

* * * * *